US007847918B2

(12) United States Patent
Yamamoto

(10) Patent No.: US 7,847,918 B2
(45) Date of Patent: Dec. 7, 2010

(54) ILLUMINATION OPTICAL SYSTEM, EXPOSURE METHOD AND DESIGNING METHOD

(75) Inventor: Tomohiko Yamamoto, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 689 days.

(21) Appl. No.: 11/639,346

(22) Filed: Dec. 15, 2006

(65) Prior Publication Data

US 2008/0030706 A1 Feb. 7, 2008

(30) Foreign Application Priority Data

Aug. 1, 2006 (JP) ............... 2006-210106

(51) Int. Cl.
*G03B 27/42* (2006.01)
(52) U.S. Cl. .......................... 355/53; 355/67
(58) Field of Classification Search .......... 355/53, 355/30, 67
See application file for complete search history.

(56) References Cited

U.S. PATENT DOCUMENTS 6,855,486 B1    2/2005   Finders et al.

2002/0172872 A1*  11/2002  Hoshino ................. 430/5
2004/0156030 A1*  8/2004   Hansen .................. 355/67
2006/0126046 A1*  6/2006   Hansen .................. 355/55

FOREIGN PATENT DOCUMENTS

JP    2001-126983 A    5/2001

* cited by examiner

*Primary Examiner*—Alan A Mathews
*Assistant Examiner*—Mesfin T Asfaw
(74) *Attorney, Agent, or Firm*—Westerman, Hattori, Daniels & Adrian, LLP

(57) ABSTRACT

Exposure for performing patterning in which micropatterns differing in pitch exist in close vicinity to one another is handled, and micropatterns are formed with high accuracy with sufficient manufacture process margins without using a photomask complicated in manufacturing process at high manufacture cost like an alternating phase shift mask. A light intensity distribution of irradiation light constituted of double pole illuminations is formed to correspond to L&S patterns. The double pole illumination is constituted of a pair of illumination modes, and the double pole illumination is constituted of a pair of illumination modes.

7 Claims, 19 Drawing Sheets

ILLUMINATION OPTICAL SYSTEM, EXPOSURE METHOD AND DESIGNING METHOD

CROSS-REFERENCE TO RELATED APPLICATIONS

This application is based upon and claims the benefit of priority from the prior Japanese Patent Application No. 2006-210106, filed on Aug. 1, 2006, the entire contents of which are incorporated herein by reference.

BACKGROUND OF THE INVENTION

1. Field of the Invention

The present invention relates to an illumination optical system which illuminates an object of irradiation, an aligner and an exposure method including the illumination optical system, and used in lithography for manufacturing various kinds of devises such as semiconductor devices and liquid crystal display devices, and a designing method of a device.

2. Description of the Related Art

With high densification of semiconductor elements, microfabrication of patterns formed with lithography has been advanced. As a method for accurately forming micropatterns, a multiple exposure process using an alternating phase shift mask is proposed.

The method of the multiple exposure process will be described by using FIGS. 21A to 21C.

For example, when a gate layer in a logic circuit of a semiconductor device is to be formed, an element isolation region 101 and an active region 102 defined by the element isolation region 101 exist on a silicon substrate as shown in FIG. 21A. The gate layer is ordinarily formed to be across the active region 102.

On forming the gate layer, a first mask pattern 104 is firstly exposed onto a photoresist (not shown) of the silicon substrate by using a first photomask 103 that is an ordinary chrome mask, an attenuated phase shift mask or the like. Thereafter, as shown in FIG. 21B, a second mask pattern 106 is exposed onto the photoresist to overlap the first mask pattern 104 (double exposure) by using a second photomask 105 that is an alternating phase shift mask.

The alternating phase shift mask is constructed so that the phases of adjacent mask patterns are shifted by $\pi$ (180°). When exposure is performed by using the alternating phase shift mask, the light intensity becomes very steep, and by using a relatively small illumination system, very wide depth of focus can be obtained. As a result, as shown in FIG. 21C, a gate layer 111 which is narrowed in width only on the active region 102 is formed. When a gate layer is formed with double (multiple) exposure like this, an extremely wide exposure margin can be obtained as compared with single exposure.

An alternating phase shift mask makes desired microfabrication possible with an extremely wide margin as described above, but on the other hand, it has the problems that its manufacturing process is complicated and manufacture cost is high. The problem of the three-dimensional structure of the alternating phase shift mask cannot be treated lightly. On manufacturing an alternating phase shift mask, the lower portion of a light shield film between 0 and $\pi$ is in the shape of eaves. This is made to have a three-dimensional structure for the purpose of eliminating unbalance of intensity of light which is transmitted through each open portion. However, if miniaturization of processing dimensions advances, and the light shield film becomes small, this is expected to be a large problem in manufacturing photomasks.

In this respect, an art of Japanese Patent Application Laid-open No. 2001-126983 is proposed as a multiple exposure process. This art is the art of dividing mask data into two, and transferring the divided patterns by using optimum illumination systems and optical conditions for the respective patterns and using a double pole illumination as at least one illumination system. This is the multiple exposure process without using an alternating phase shift mask, and is advantageous in the respect that the manufacture cost is low. However, this method uses one photomask for one pattern on exposing a number of patterns, and therefore, it has the problem of being incapable of obtaining a sufficient manufacture process margin.

Further, with miniaturization of processing dimensions, the need for patterning so that micropatterns differing in pitch exist in close vicinity to one another has been intensified recently, and an exposure process sufficiently corresponding to such a construction has been demanded. As a method capable of corresponding to such a demand, the above described multiple exposure process is also one of potential methods, but it is difficult for the multiple exposure process to obtain a sufficient manufacture process margin as described above.

SUMMARY OF THE INVENTION

The present invention is made in view of the above described problems, and has an object to provide an illumination optical system, an aligner, an exposure method and a designing method with high reliability, which correspond to exposure for performing patterning in which micropatterns differing in pitch exist in close vicinity to one another, and are capable of accurately forming micropatterns with sufficient manufacture process margins without using a photomask complicated in manufacture process at high manufacture cost like an alternating phase shift mask.

An illumination optical system of the present invention includes a light source which generates irradiation light, a condensing optical system which condenses the irradiation light, and an illumination control mechanism which controls the irradiation light passing through the aforesaid condensing optical system to irradiate it to an irradiation object, and the aforesaid illumination control mechanism adjusts a light intensity distribution of the irradiation light to be irradiated to the irradiation object to be in an illumination state in which a plurality of double pole illuminations or a plurality of quadrupole illuminations are combined at positions differing from each other.

An aligner of the present invention is an aligner which exposes and transfers a mask pattern of a photomask that is the irradiation object to a transfer object, and includes the aforesaid illumination optical system and a projection optical system which condenses the irradiation light passing through the mask pattern of the photomask to the transfer object.

A method for controlling illumination of the present invention adjusts a light intensity distribution of irradiation light which is irradiated to an irradiation object to be in an illumination state in which a plurality of double pole illuminations or a plurality of quadrupole illuminations are combined at positions differing from each other when controlling the irradiation light and irradiating it to the irradiation object.

A designing method of the present invention is a designing method on performing pattern formation, and selectively carries out one of the following steps when a manufacturing process margin estimated based on design data of the pattern formation does not satisfy a reference value: a first step of changing a design layout of the pattern to satisfy an allowable range in the illumination state when obtaining the design data; and a second step of optimizing the illumination state by performing a simulation of adjusting a light intensity distribution of irradiation light which is irradiated to a photomask to be in an illumination state in which a plurality of double pole illuminations or a plurality of quadrupole illuminations are combined at positions differing from each other to be adapted to the design layout in the design layout of the pattern when obtaining the design data.

An exposure method of the present invention exposes and transfers a maskpattern of the photomask to the transfer object in accordance with the design layout and the illumination state obtained by the designing method.

DETAILED DESCRIPTION OF THE PREFERRED EMBODIMENTS

—Basic Gist of the Present Invention—

In order to realize light irradiation corresponding to various patterns by one exposure, the present invention presents an illumination optical system including an illumination control mechanism which adjusts a light intensity distribution of irradiation light which is irradiated to an irradiation object (photomask) to be in an illumination state in which a plurality of double pole illuminations or a plurality of quadrupole illuminations are combined at different positions from each other.

First, in order to correspond to exposure for performing patterning in which micropatterns differing in pitch exist in close vicinity to one another, the case where the patterns of the most frequent appearance are a several kinds of band-shaped patterns differing in pitch and extending in one direction is taken. Here, the case of bringing about the illumination state in which a plurality of double pole illuminations are combined at different position from each other, which copes with such patterns, will be described. Note that the present invention can cope with not only those differing in pitch but also those differing in line width as the patterns.

A double pole illumination is the illumination form including a pair (two) of illumination modes on the phantom line perpendicular to the extending direction of a mask pattern in a photomask.

Figure 1A:
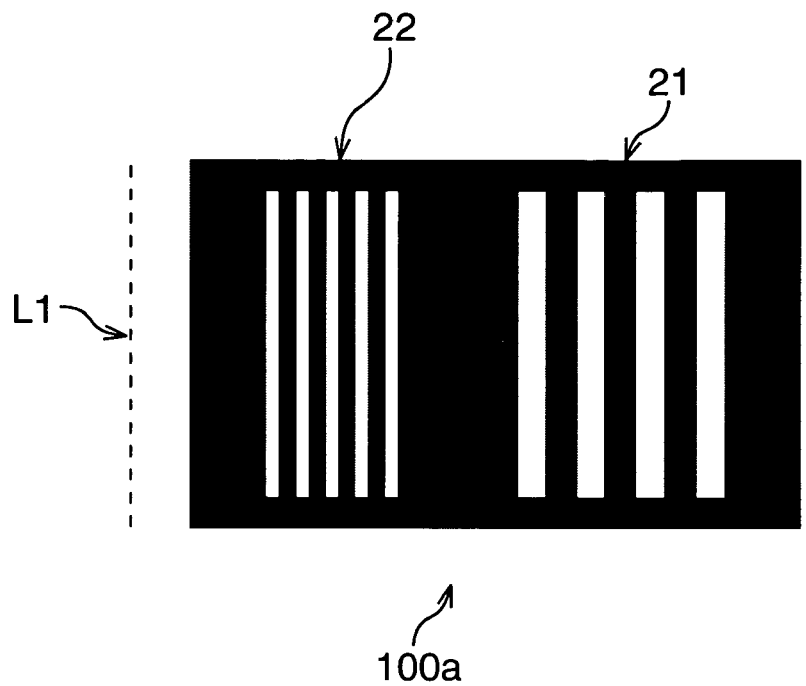
FIGS. 1A and 1B are schematic views for explaining the illumination form in the present invention.

First, the case of irradiating light to two kinds of line and space (L&S) patterns 21 and 22 differing in pitch with mask patterns in a photomask 100a extending in a direction parallel with the phantom broken line L1 as shown in FIG. 1A will be described.

Figure 1B:
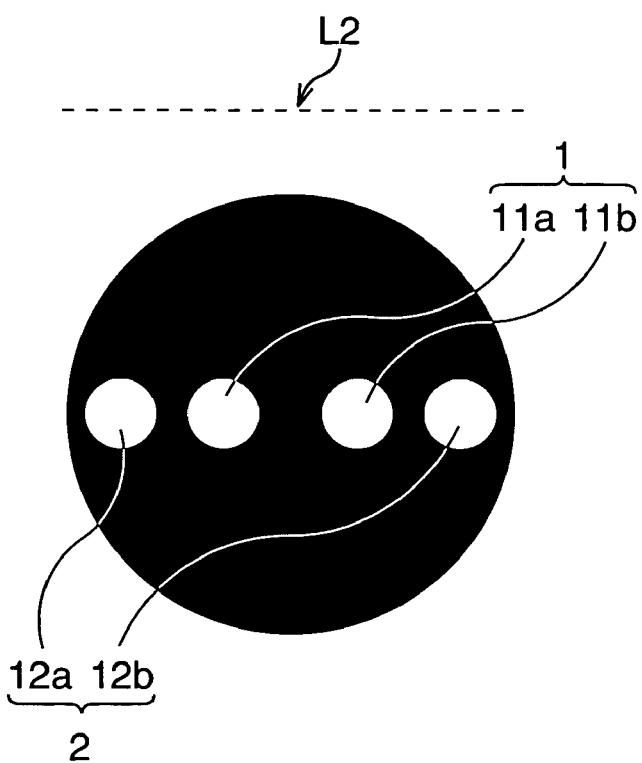

In the present invention, in order to correspond to the L&S patterns 21 and 22, a light intensity distribution of illumination light constituted of double pole illuminations 1 and 2 is formed as shown in FIG. 1B. The double pole illumination 1 is constructed by a pair of illumination modes 11a and 11b, and the double pole illumination 2 is constructed by a pair of illumination modes 12a and 12b. Here, the light intensity distribution of the irradiation light is formed so that a distance D1 between a pair of illumination modes 11a and 11b and a distance D2 between a pair of illumination modes 12a and 12b differ (D1<D2), and these illumination modes 11a, 11b, 12a and 12b are arranged in parallel with the phantom broken line L2 perpendicular to the phantom broken line L1. The light intensity distribution takes a peak value in each of the illumination modes 11a, 11b, 12a and 12b, and the light intensity distribution is zero in the other light shielding portions.

The double pole illumination 1 constituted of the illumination modes 11a and 11b with the short separation distance forms a light intensity distribution optimized corresponding to the L&S pattern 21 with wide pitches. The double pole illumination 2 constituted of the illumination modes 12a and 12b with the long separation distance forms the light intensity distribution optimized corresponding to the L&S pattern 22 with narrow pitches. In this manner, the light irradiation which is individually optimized for the L&S patterns 21 and 22 differing in pitch can be realized with one exposure. Accordingly, fine patterns can be accurately formed with sufficient manufacture process margins obtained.

Figure 2A:
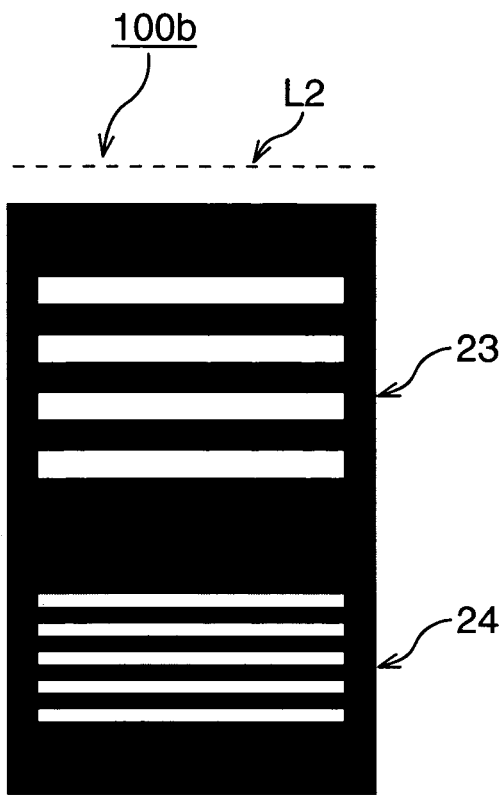
FIGS. 2A and 2B are schematic views for explaining the illumination form in the present invention.

Similarly, the case of irradiating light to two kinds of L&S patterns 23 and 24 differing in pitch with mask patterns in a photomask 100b extending in a direction parallel with the phantom broken line L2 as shown in FIG. 2A will be described.

Figure 2B:
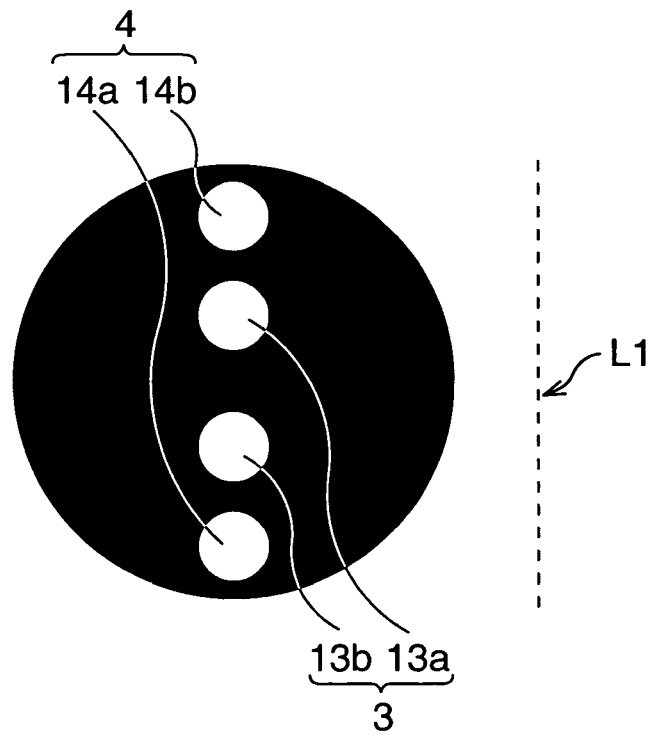

In the present invention, in order to correspond to the L&S patterns 23 and 24, a light intensity distribution of irradiation light constituted of double pole illuminations 3 and 4 is formed as shown in FIG. 2B. The double pole illumination 3 is constructed by a pair of illumination modes 13a and 13b, and the double pole illumination 4 is constructed by a pair of illumination modes 14a and 14b. Here, the light intensity distribution of irradiation light is formed so that a distance D3 between a pair of illumination modes 13a and 13b, and a distance D4 between a pair of illumination modes 14a and 14b differ (D3<D4), and these illumination modes 13a, 13b, 14a and 14b are arranged in parallel with the phantom broken line L1 perpendicular to the phantom broken line L2. In each of the illumination modes 13a, 13b, 14a and 14b, the light intensity distribution takes a peak value, and the light intensity distribution is zero in the other light shielding portions.

The double pole illumination 3 constituted of the illumination modes 13a and 13b with the short separation distance forms the light intensity distribution optimized corresponding to the L&S pattern 23 with wide pitches. Meanwhile, the double pole illumination 4 constituted of the illumination modes 14a and 14b with the long separation distance forms the light intensity distribution optimized corresponding to the L&S pattern 24 with narrow pitches. In this manner, the light irradiation which is individually optimized for the L&S patterns 23 and 24 differing in pitch can be realized with one exposure. Accordingly, fine patterns can be accurately formed with sufficient manufacture process margins obtained.

Figure 3A:
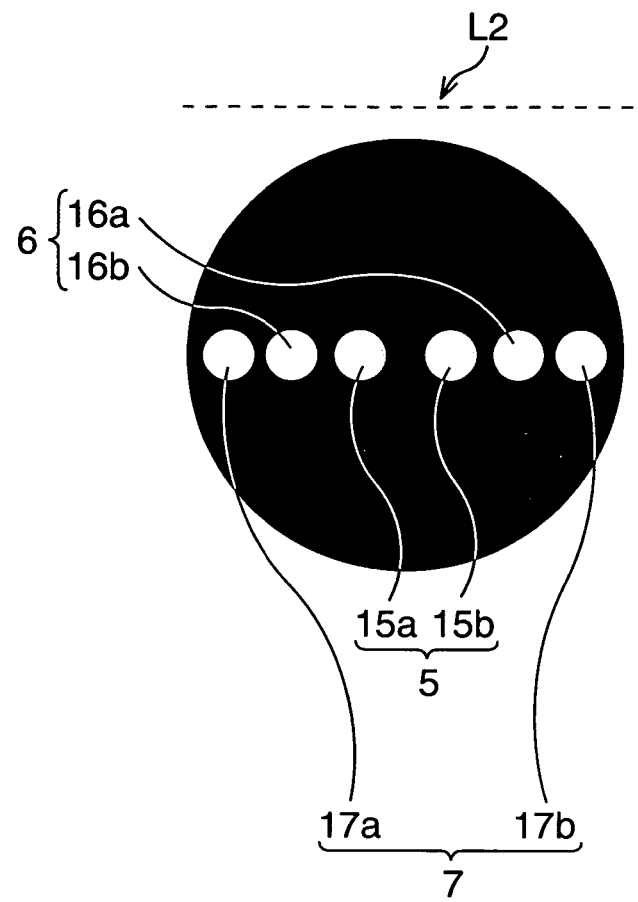
FIGS. 3A and 3B are schematic views for explaining the illumination form in the present invention.

Further, the case of irradiating light to three kinds of line & space (L&S) patterns differing in pitch with mask patterns in a photomask extending in a direction parallel with the phantom broken line L2 will be described. As shown in FIG. 3A, the light intensity distribution of irradiation light constituted of double pole illuminations 5, 6 and 7 is formed. The double pole illumination 5 is constructed by a pair of illumination modes 15a and 15b, the double pole illumination 6 is constructed by a pair of illumination modes 16a and 16b, and the double pole illumination 7 is constructed by a pair of illumination modes 17a and 17b.

Here, the light intensity distribution of irradiation light is formed so that the distance D5 between a pair of illumination modes 15a and 15b, a distance D6 between a pair of illumination modes 16a and 16b, and a distance D7 between a pair of illumination modes 17a and 17b differ (D5<D6<D7), and the illumination modes 15a, 15b, 16a, 16b, 17a and 17b are arranged in parallel with the phantom broken line L2 perpendicular to the phantom broken line L. The light intensity distribution takes a peak value in each of the illumination modes 15a, 15b, 16a, 16b, 17a and 17b, and the light intensity distribution is zero in the other light shielding portions.

The double pole illumination 5 constituted of the illumination modes 15a and 15b with the shortest separation distance forms the light intensity distribution optimized corresponding to the L&S pattern with the widest pitches. The double pole illumination 6 constituted of the illumination modes 16a and 16b with about the intermediate separation distance forms the light intensity distribution optimized corresponding to the L&S pattern with about intermediate pitches. The double pole illumination 7 constituted of the illumination modes 17a and 17b with the longest separation distance forms the light intensity distribution optimized corresponding to the L&S pattern with the narrowest pitches. In this manner, light irradiation individually optimized for three kinds of L&S patterns differing in pitch can be realized with one exposure. Therefore, mictropatterns can be accurately formed with sufficient manufacture process margins obtained.

Similarly, the case of irradiating light to three kinds of L&S patterns differing in pitch with mask patterns in a photomask extending in a direction parallel with the phantom broken line L1 will be described.

Figure 3B:
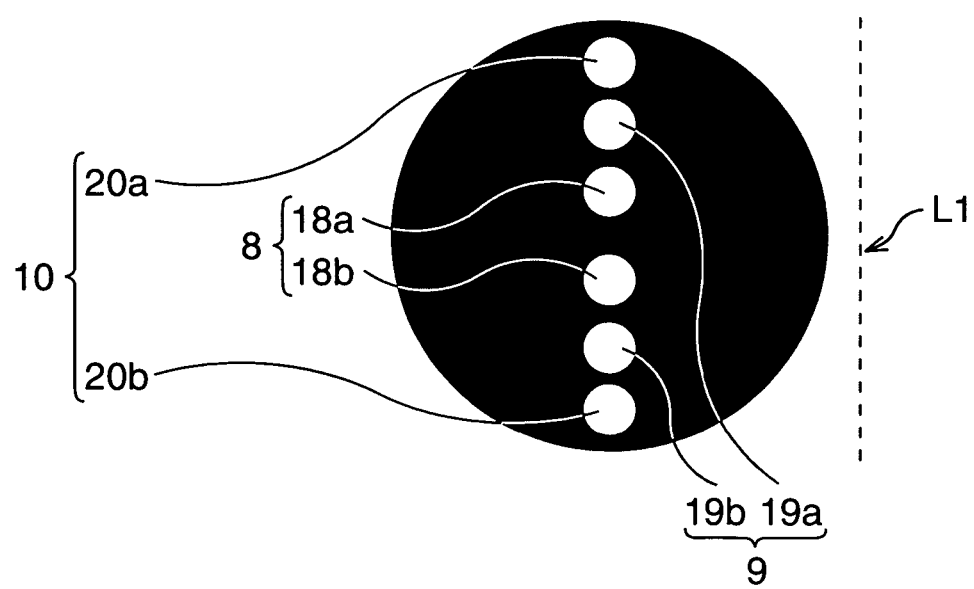

As shown in FIG. 3B, the light intensity distribution of irradiation light constituted of double pole illuminations 8, 9 and 10 is formed. Namely, the light intensity distribution of irradiation light is formed so that a distance D8 between a pair of illumination modes 18a and 18b constituting the double pole illumination 8, a distance D9 between a pair of illumination modes 19a and 19b constituting the double pole illumination 9, and a distance D10 between a pair of illumination modes 20a and 20b constituting the double pole illumination 10 differ (D8<D9<D 10), and the illumination modes 18a, 18b, 19a, 19b, 20a and 20b are arranged in parallel with the phantom broken line L1 perpendicular to the phantom broken line L2. The light intensity distribution takes a peak value in each of the illumination modes 18a, 18b, 19a, 19b, 20a and 20b, and the light intensity distribution is zero in the other light shielding portions.

The double pole illumination 8 constituted of the illumination modes 18a and 18b with the shortest separation distance forms the light intensity distribution optimized corresponding to the L&S pattern with the widest pitches. The double pole illumination 9 constituted of the illumination modes 19a and 19b with about the intermediate separation distance forms the light intensity distribution optimized corresponding to the L&S pattern with about intermediate pitches. The double pole illumination 10 constituted of the illumination modes 20a and 20b with the longest separation distance forms the light intensity distribution optimized corresponding to the L&S pattern with the narrowest pitches. In this manner, light irradiation individually optimized for three kinds of L&S patterns differing in pitch can be realized with one exposure. Therefore, mictropatterns can be accurately formed with sufficient manufacture process margins obtained.

As described above, in the illumination control mechanism in the present invention, the light intensity distribution of the irradiation light which is irradiated to the photomasks is adjusted to be in the state in which N kinds of double pole illuminations are combined at different positions from each other corresponding to the number N of L&S patterns (N is an integer which is 2 or more: N=2, 3 in the above described example) differing in pitch and extending in the same direction.

Next, in order to correspond to exposure for performing patterning in which micropatterns differing in pitch exist in close vicinity to one another, the case of bringing about the illumination state in which a plurality of quadrupole illuminations are combined at different positions from each other, which copes with the case where the patterns of the most frequent appearance are constituted of several kinds of band-shaped patterns differing in pitch and extending in a first direction, and several kinds of band-shaped patterns differing in pitch and extending in a second direction perpendicular to the first direction, will be described.

The quadupole illumination is the illumination form including a pair (two) of illumination modes on a phantom line in the first direction perpendicular to the second direction which is the extending direction of one of mask patterns in a photomask, and a pair (two) of illumination modes on a phantom line in the second direction perpendicular to the first direction which is the extending direction of the other mask pattern.

Figure 4A:
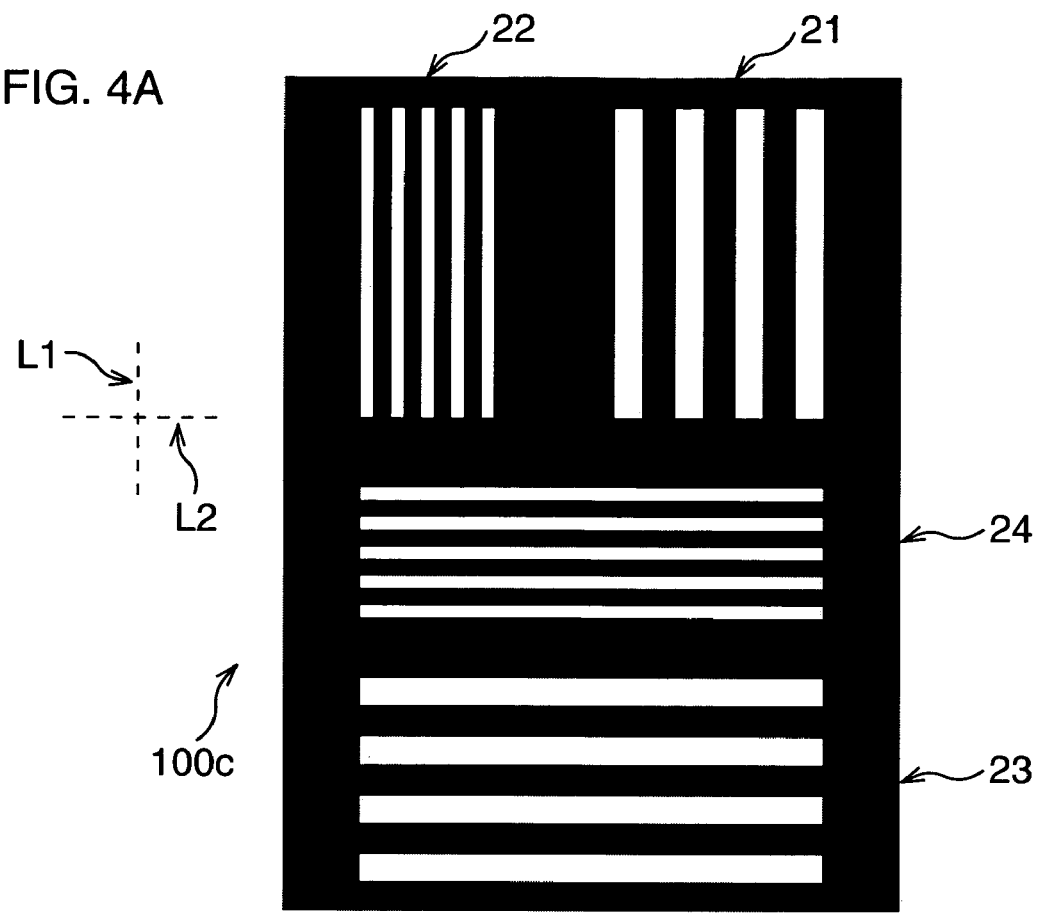
FIGS. 4A and 4B are schematic views for explaining the illumination form in the present invention.

The case of irradiating light to two kinds of line & space (L&S) patterns differing in pitch and extending in a direction parallel with the phantom broken line L1, and two kinds of L&S patterns 23 and 24 differing in pitch and extending in a direction parallel with the phantom broken line L2 perpendicular to the phantom broken line L1, as the mask patterns in a photomask 100c, as shown in FIG. 4A will be described.

Figure 4B:
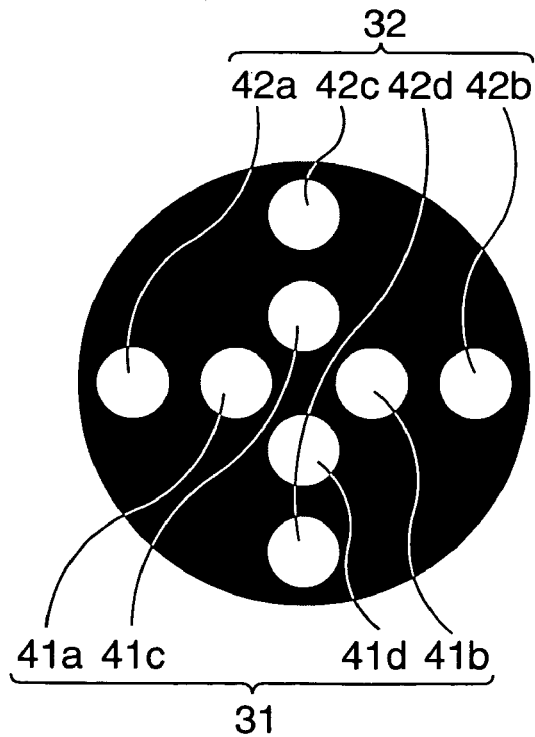

In the present invention, in order to correspond to the L&S patterns 21, 22, 23 and 24, the light intensity distribution of the irradiation light constituted of quadrupole illuminations 31 and 32 is formed as shown in FIG. 4B. Here, the quadrupole illumination 31 is constructed by combining a pair of illumination modes 41a and 41b, and a pair of illumination modes 41c and 41d. The quadrupole illumination 32 is constructed by combining a pair of illumination modes 42a and 42b, and a pair of illumination modes 42c and 42d.

Here, the light intensity distribution of irradiation light is formed so that a distance D11 between the illumination modes 41a and 41b and a distance D12 between a pair of illumination modes 42a and 42b differ (D11<D12), and the illumination modes 41a, 41b, 42a and 42b are arranged in parallel with the phantom broken line L2. Similarly, the light intensity distribution of irradiation light is formed so that a distance D13 between the illumination modes 41c and 41d, and a distance D14 between a pair of illumination modes 42c and 42d differ (D13<D14), and these illumination modes 41c, 41d, 42c and 42d are arranged in parallel with the phantom broken line L1. The light intensity distribution takes a peak value in each of the illumination modes 41a, 41b, 41c, 41d, 42a, 42b, 42c and 42d, and the light intensity distribution is zero in the other light shielding portions.

Of the quadrupole illumination 31 with the short separation distances between the illumination modes, the illumination modes 41a and 41b form the light intensity distribution optimized corresponding to the L&S pattern 21 with wide pitches. The illumination modes 41c and 41d form the light intensity distribution optimized corresponding to the L&S pattern 23 with wide pitches.

Meanwhile, of the quadrupole illumination 32 with long separation distances between the illumination modes, the illumination modes 42a and 42b form the light intensity distribution optimized corresponding to the L&S pattern 22 with narrow pitches. The illumination modes 42c and 42d forms the light intensity distribution optimized corresponding to the L&S pattern 24 with narrow pitches.

By using the quadrupole illuminations 31 and 32 like this, light irradiation individually optimized for the L&S patterns 21, 22, 23 and 24 differing in pitch and extending direction can be realized with one exposure. Accordingly, micropatterns can be accurately formed with sufficient manufacture process margins obtained.

Figure 5:
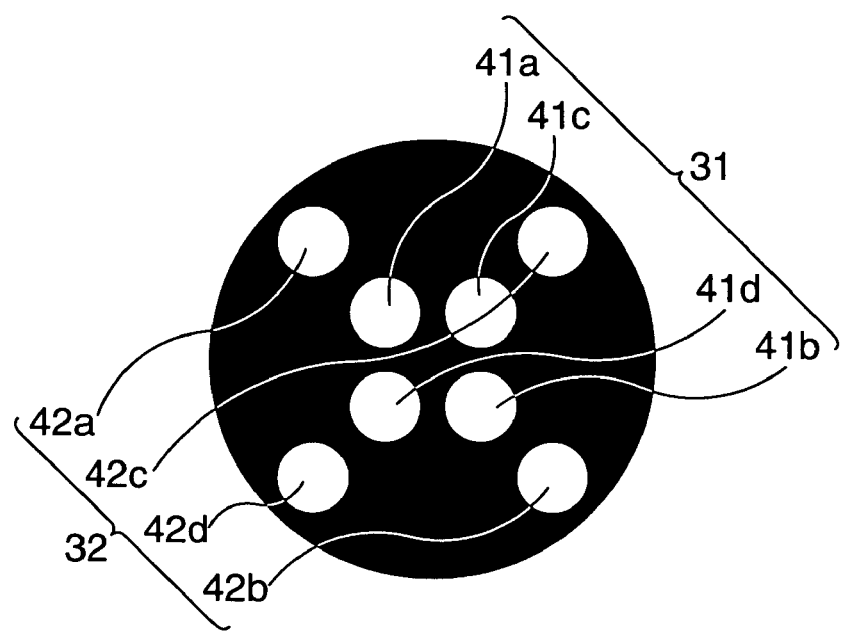
FIG. 5 is a schematic view for explaining the illumination form in the present invention.

In order to correspond to the pattern in which the L&S patterns 21, 22, 23 and 24 rotationally move respectively, for example, rotate by 45°, the illumination state in which the quadrupole illuminations 31 and 32 are similarly rotated by 45° is applied as shown in FIG. 5.

Similarly, the case of irradiating light to three kinds of line & space (L&S) patterns differing in pitch and extending in a direction parallel with the phantom broken line L1, and three kinds of L&S patterns differing in pitch and extending in a direction parallel with the phantom broken line L2, as the mask patterns in a photomask will be described.

Figure 6:
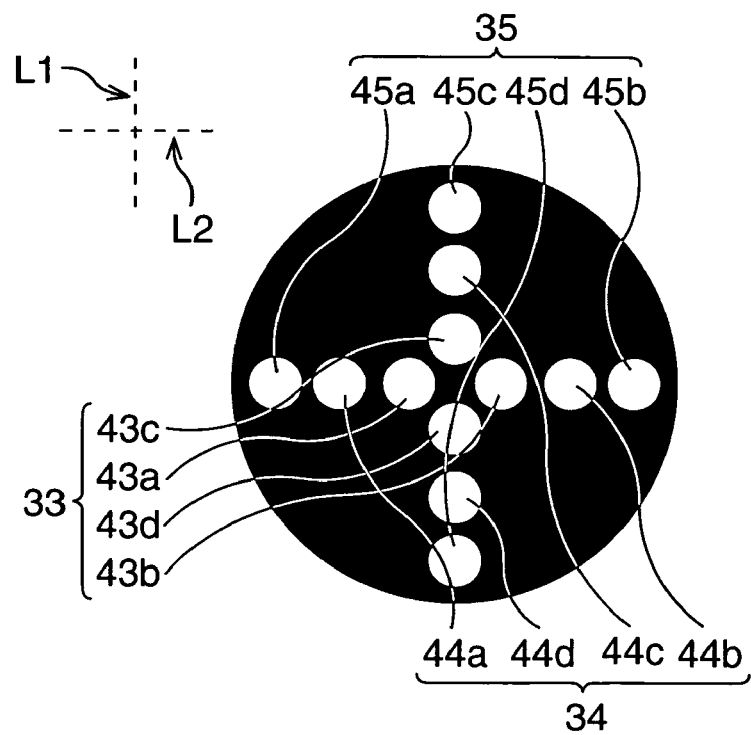
FIG. 6 is a schematic view for explaining the illumination form in the present invention.

In the present invention, in order to correspond to the above described L&S patterns, the light intensity distribution of the irradiation light constituted of quadrupole illuminations 33, 34 and 35 is formed, as shown in FIG. 6. Here, the quadrupole illumination 33 is constructed by combining a pair of illumination modes 43a and 43b, and a pair of illumination modes 43c and 43d. The quadrupole illumination 34 is constructed by combining a pair of illumination modes 44a and 44b, and a pair of illumination modes 44c and 44d. The quadrupole illumination 35 is constructed by combining a pair of illumination modes 45a and 45b, and a pair of illumination modes 45c and 45d.

Here, the light intensity distribution of irradiation light is formed so that a distance D21 between the illumination modes 43a and 43b, a distance D22 between a pair of illumination modes 44a and 44b, and a distance D23 between a pair of illumination modes 45a and 45b differ (D21<D22<D23), and the illumination modes 43a, 43b, 44a, 44b, 45a and 45b are arranged in parallel with the phantom broken line L2. Similarly, the light intensity distribution of irradiation light is formed so that a distance D24 between the illumination modes 43c and 43d, a distance D25 between a pair of illumination modes 44c and 44d, and a distance D26 between a pair of illumination modes 45c and 45d differ (D24<D25<D26), and these illumination modes 43c, 43d, 44c, 44d, 45c and 45d are arranged in parallel with the phantom broken line L1. The light intensity distribution takes a peak value in each of the illumination modes 43a, 43b, 43c, 43d, 44a, 44b, 44c, 44d, 45a, 45b, 45c and 45d, and the light intensity distribution is zero in the other light shielding portions.

Of the quadrupole illumination 33 with the shortest separation distances between the illumination modes, the illumination modes 43a and 43b form the light intensity distribution optimized corresponding to the L&S pattern (parallel with the phantom broken line L2) with the widest pitches. The illumination modes 43c and 43d form the light intensity distribution optimized corresponding to the L&S pattern (parallel with the phantom broken line L1) with the widest pitches.

Of the quadrupole illumination 34 with about the intermediate separation distance between the illumination modes, the illumination modes 44a and 44b form the light intensity distribution optimized corresponding to the L&S pattern (parallel with the phantom broken line L2) with about the intermediate pitches. The illumination modes 44c and 44d form the light intensity distribution optimized corresponding to the L&S pattern (parallel with the phantom broken line L1) with about the intermediate pitches.

Of the quadrupole illumination 35 with the longest separation distances between the illumination modes, the illumination modes 45a and 45b form the light intensity distribution optimized corresponding to the L&S pattern (parallel with the phantom broken line L2) with the narrowest pitches. The illumination modes 45c and 45d form the light intensity distribution optimized corresponding to the L&S pattern (parallel with the phantom broken line L1) with the narrowest pitches.

By using the quadrupole illuminations 33, 34 and 35 like this, light irradiation individually optimized for the L&S patterns differing in pitch and extending direction can be realized with one exposure. Accordingly, micropatterns can be accurately formed with sufficient manufacture process margins obtained.

As described above, in the illumination control mechanism in the present invention, the light intensity distribution of the illumination light which is irradiated to the photomask is adjusted to be in the state in which N kinds of quadrupole illuminations are combined at different positions from each other corresponding to N number (N is an integer of two or more: N=2, 3 in the above described example) of L&S patterns differing in pitch and extending direction.

In order to obtain the light intensity distributions as in FIGS. 1B, 2B, 3, 4B, 5 and 6 for the photomasks, the following two kinds of methods are conceivable. Here, the methods will be described with the case of FIG. 1B taken as an example.

As the first method, in the illumination control mechanism, an illumination diaphragm including apertures corresponding to the respective illumination modes 11a, 11b, 12a and 12b (However, the positions, sizes, shapes and the like of the apertures are variable, and do not have to strictly correspond to the shapes of the illumination modes.) is used.

As the second method, in the illumination control mechanism, by using the optical system including a plurality of prisms, and by fully using the prisms installed at predetermined positions, the respective illumination modes 11a, 11b, 12a and 12b are synthetically formed.

—Preferred Embodiment to which Present Invention is Applied—

On the basis of the above described basic gist, a preferred embodiment to which the present invention is applied will now be described in detail with reference to the drawings.

—Schematic Construction of Aligner—

Figure 7:
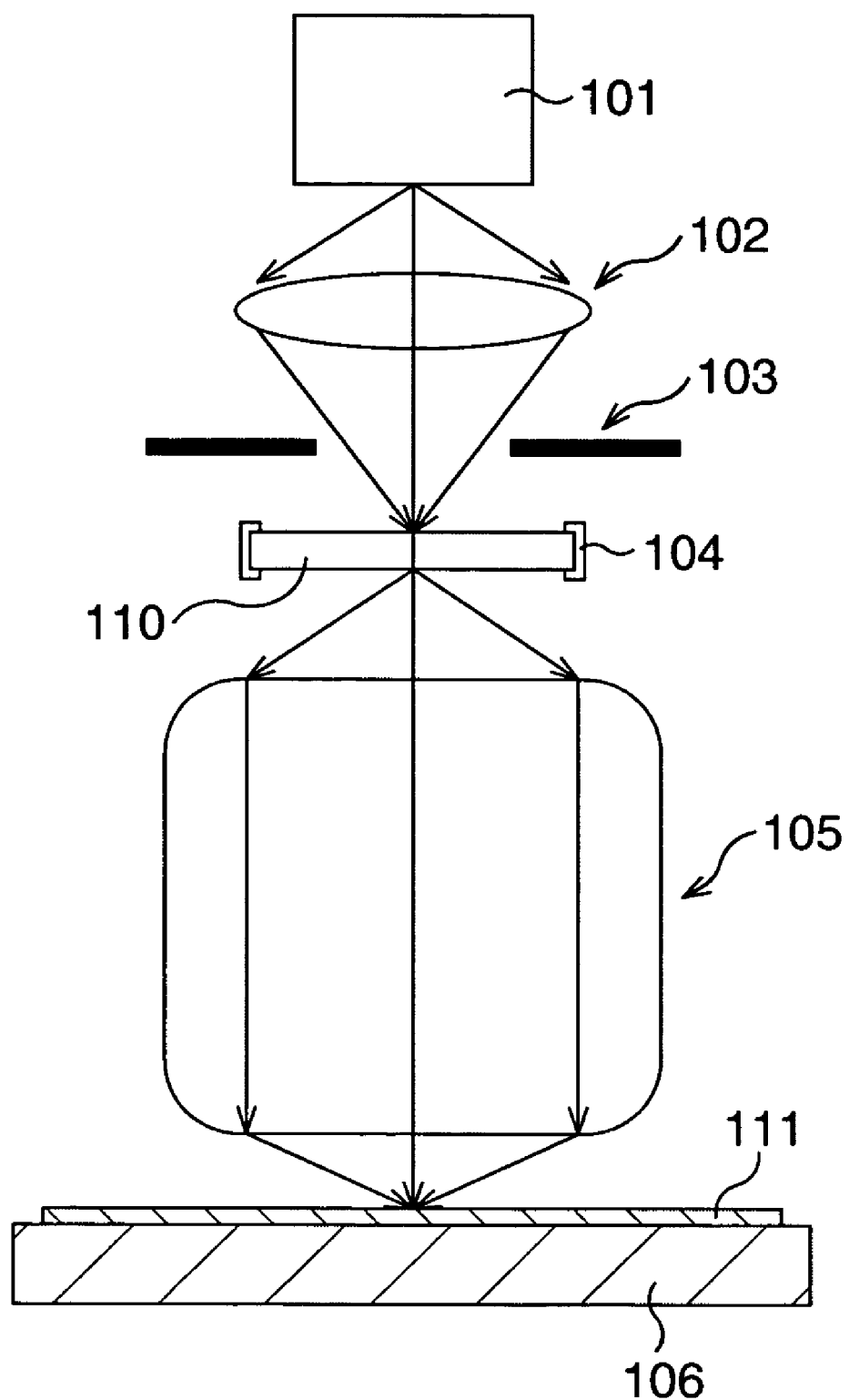
FIG. 7 is a schematic view showing a schematic configuration of an aligner according to an embodiment.

FIG. 7 is a schematic view showing a schematic construction of an aligner according to the embodiment.

The aligner performs so-called reduction projection exposure, and is constructed by including an illumination source 101 which irradiates exposure light, a condensing optical system 102 which condenses irradiated exposure light to a desired part of a photomask, an illumination control mechanism 103 which controls the exposure light passing through the condensing optical system 102 and irradiates it to a photomask 110, a reticle stage 104 on which the photomask is placed and fixed, a projecting optical system 105 which projects the exposure light passing through the mask pattern of the photomask 110 to a desired region of a transfer object, and a wafer stage 106 on which the transfer object is placed and fixed.

The illumination source 101 is, for example, ArF excimer laser, and ArF excimer laser light of a wavelength of 193 nm is irradiated as exposure light.

The condensing optical system 102 is constructed by including various kinds of lenses which condense exposure light, and a fly-eye lens which homogenizes the illuminance of the exposure light.

The illumination control mechanism 103 adjusts the light intensity distribution of the exposure light irradiated to the photomask to be in the illumination state in which a plurality of double pole illuminations, or a plurality of quadrupole illuminations are combined at different positions from each other. As the illumination states, there are those made by combining the illumination modes as in, for example, FIG. 1B, FIG. 2B, FIG. 3 and FIG. 4 in the case of a plurality of double pole illuminations, and those made by combining the illumination modes as in, for example, FIG. 4B, FIG. 5 and FIG. 6 in the case of a plurality of quadrupole illuminations.

The illumination control mechanism 103 can adjust the light intensity distribution into the illumination state in which the size, position, shape and the like of each illumination mode are changed. As a concrete example, in the illumination state in FIG. 1B, the illumination modes 11a and 11b, and the illumination modes 12a and 12b are equidistantly formed from the center portion of the disk shape, and in the illumination state in FIG. 2B, the illumination modes 13a and 13b, and the illumination modes 14a and 14b are equidistantly formed respectively from the center portion of the disk shape.

These states are set as the reference positions. The case where the illumination state in FIG. 1B is set as the reference position will be described hereinafter.

Figure 8A:
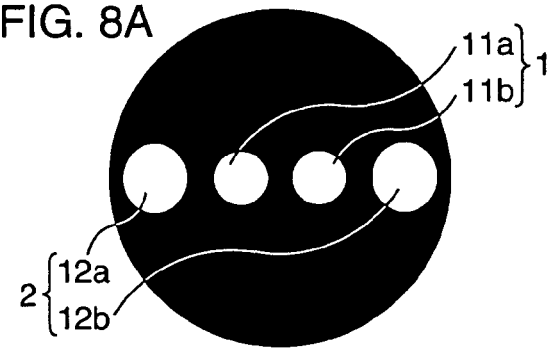
FIGS. 8A to 8H are schematic views showing respective illumination states of a double pole illumination.

In an illumination state A1, adjustment is made so that the size of the illumination modes 12a and 12b of the double pole illumination 2 becomes large as compared with the illumination modes 11a and 11b of the double pole illumination 1 as shown in FIG. 8A. As shown in FIG. 8B, in an illumination state A2, adjustment is made so that the size of the illumination modes 11a and 11b of the double pole illumination 1 becomes large as compared with the illumination modes 12a and 12b of the double pole illumination 2.

Figure 8E:
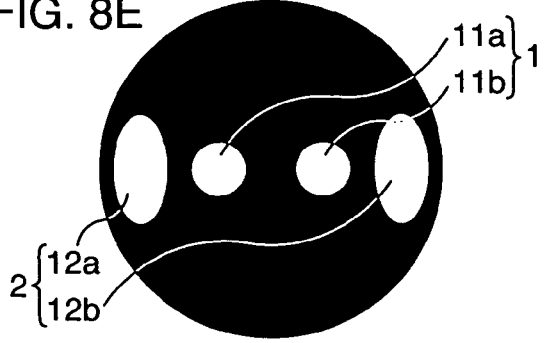
Figure 8B:
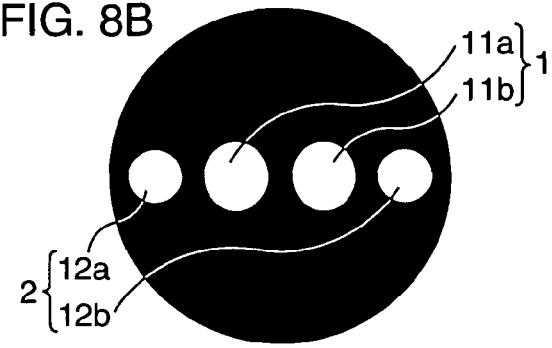
Figure 8F:
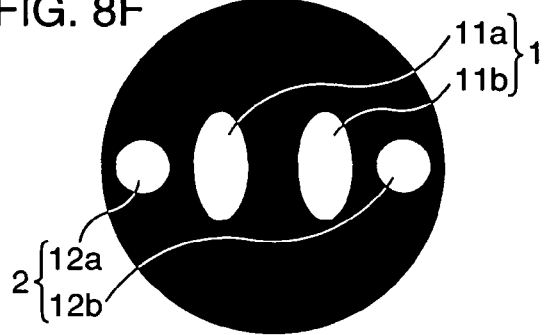
Figure 8C:
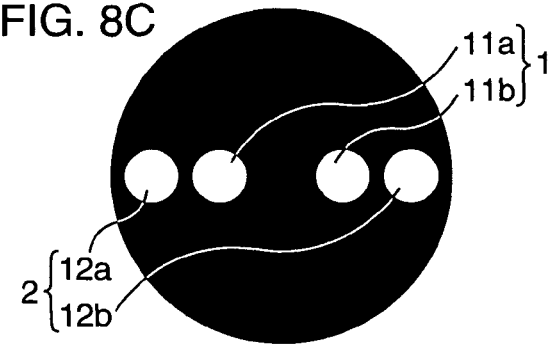

In an illumination state A3, the illumination modes 11a and 11b of the double pole illumination 1, and the illumination modes 12a and 12b of the double pole illumination 2 are adjusted so that the position of each of the illumination modes is shifted outward from the reference position of the illumination state, as shown in FIG. 8C. In an illumination state A4, the illumination modes 11a and 11b of the double pole illumination 1 and the illumination modes 12a and 12b of the double pole illumination 2 are adjusted so that the position of each of the illumination modes is shifted inward from the reference position of the illumination state, as shown in FIG. 8D.

In an illumination state A5, adjustment is made so that the shapes of the illumination modes 12a and 12b of the double pole illumination 2 are extended in the longitudinal direction as compared with the illumination modes 11a and 11b of the double pole illumination 1, as shown in FIG. 8E. In an illumination state A6, adjustment is made so that the shapes of the illumination modes 11a and 11b of the double pole illumination 1 are extended in the longitudinal direction as compared with the illumination modes 12a and 12b of the double pole illumination 2, as shown in FIG. 8F.

Figure 8G:
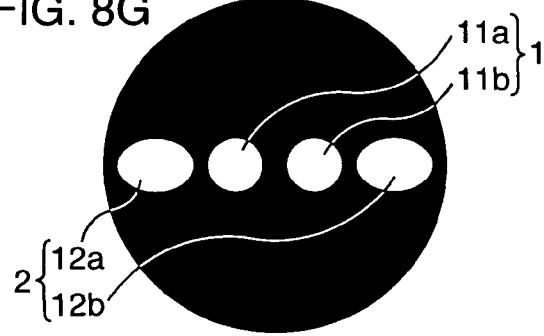
Figure 8D:
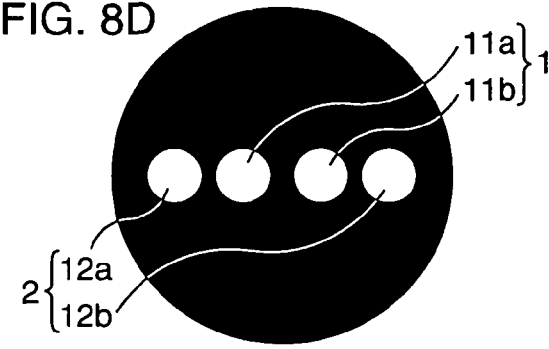
Figure 8H:
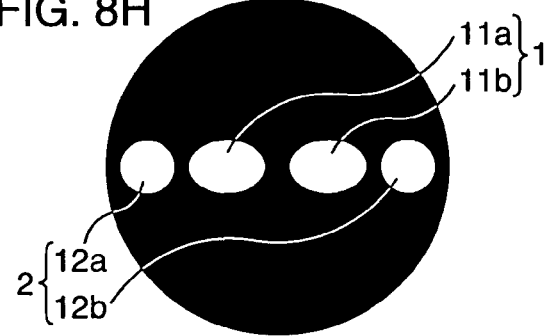

In an illumination state A7, adjustment is made so that the shapes of the illumination modes 12a and 12b of the double pole illumination 2 are extended in the lateral direction as compared with the illumination modes 11a and 11b of the double pole illumination 1, as shown in FIG. 8G. In an illumination state A8, adjustment is made so that the shapes of the illumination modes 11a and 11b of the double pole illumination 1 are extended in the lateral direction as compared with the illumination modes 12a and 12b of the double pole illumination 2, as shown in FIG. 8H.

In order to adjust the exposure light to the above described illumination state by the illumination control mechanism 103, there is the method for adjusting the shape of an illumination diaphragm (illumination σ) which focuses the exposure light. Namely, an illumination diaphragm plate is installed, the opening mode of the illumination diaphragm plate is made variable and is adjusted to establish a predetermined illumination state. By using an optical system including a plurality of prisms, and by fully using the prisms installed at predetermined positions, adjustment is made so as to establish a predetermined state. The illumination control mechanism 103 practically forms the illumination state irradiated to a photomask in this manner, and therefore, it is drawn as if it were the illumination diaphragm in FIG. 7 for convenience of illustration.

On the rectile stage 104, a photomask including various kinds of mask patterns for performing reduction projection is placed and fixed.

The wafer stage 106 is for mounting and fixing a transfer target object on which a resist film that is a transfer object is formed on its surface, a semiconductor wafer 111 in this case, thereon.

In this embodiment, an illumination optical system which irradiates light to a photomask that is an irradiation object is constructed by the illumination source 101, the condensing optical system 102 and the illumination control mechanism 103 of the above descried aligner.

In this aligner, the exposure light occurring from the illumination source 101 passes through the condensing optical system 102, adjusted to a predetermined illumination state in the illumination control mechanism 103, and is irradiated to the photomask 110. The exposure light passing through the photomask 110 (diffracted light) is condensed in the projecting optical system 105, is incident on the resist film formed on the surface of the semiconductor wafer 111, and transfers (the reduced image of) the mask pattern of the photomask 110 to the resist film.

—Designing Method of MOS Transistor—

Hereinafter, a designing method of a device, a semiconductor device (for example, MOS transistor) in this case will be described.

Figure 9:
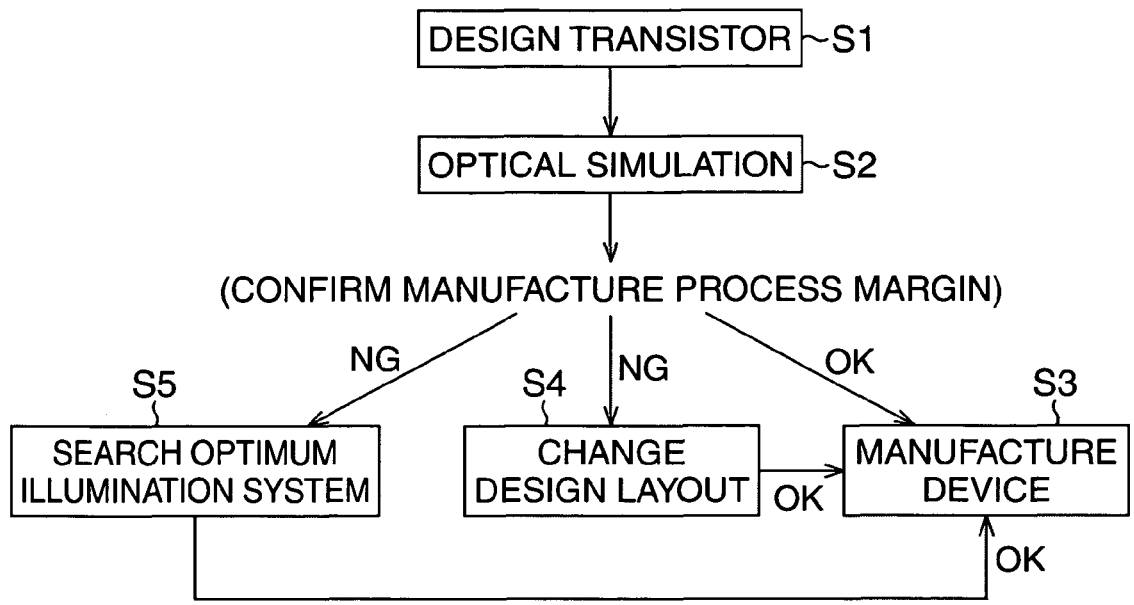
FIG. 9 is a flow chart showing a designing method of a semiconductor device according to this embodiment.

FIG. 9 is a flow chart showing a designing method of a semiconductor device.

First, design of an MOS transistor is performed (step S1). Here, in the aligner used for lithography on pattern forming, the abovementioned illumination state is considered.

Subsequently, based on the above described design result, an optical simulation (for example, photolithograpy simulation) is performed (step S2). Thereafter, based on the result of the optical simulation, the manufacture process margin is estimated from the above described design result. For example, if the reference value of the focus margin is 0.2 μm, it is determined whether or not the reference value of the focus margin is satisfied or not for all patterns. The estimation can be also performed automatically by the means which confirms a manufacture process margin.

Subsequently, when required manufacture process margins are secured for all the patters, based on the result of the estimation of the manufacture process margins, the design data is provided for manufacture of an actual semiconductor device (step S3).

When the required manufacture process margins are not secured for all or some of the patterns, the following step S4 or S5 is selectively carried out.

In step S4, in the illumination state on obtaining the design data, the design layout of the patterns is changed to meet a predetermined allowable range. The allowable range of the design layout is determined in consideration of the disposition situation in the relation of the other patterns and the pattern requiring the design layout change in consideration of the function of the pattern, the disposition situation of the pattern, and disposition of, for example, an element isolation structure (STI (Shallow Trench Isolation), LOCOS and the like), a contact hole, a via hole and the like. As change of design layout, for example, change of the pitch of the pattern (L&S pattern) and the like are conceivable.

In step S5, in the design layout of the patterns on obtaining the design data, a simulation of adjusting the light intensity distribution of the exposure light irradiated to the photomask to be in the illumination state in which a plurality of double pole illuminations or a plurality of quadrupole illuminations are combined at different positions from each other is performed to be adapted to the design layout, and the illumination state is optimized.

Specifically, as the illumination state in which a plurality of double pole illuminations are combined, there are FIGS. 1B, 2B, 3A and 3B and 4B, and taking the case where, for example, the illumination state in FIG. 1B is set as the reference position as an example, there are the illumination state A1 in FIG. 8A, the illumination state A2 in FIG. 8B, the illumination state A3 in FIG. 8C, the illumination state A4 in FIG. 8D, the illumination state A5 in FIG. 8E, the illumination state A6 in FIG. 8F, the illumination state A7 in FIG. 8G, the illumination state A8 in FIG. 8H and the like. Simulations are performed in accordance with the various conditions such as the forming position, width, pitch and the like of the pattern requiring optimization of the illumination state, and the optimum illumination state is selected from them, for example.

Subsequently, step S4 or S5 is selectively carried out, and after the design data is changed, the design data is provided for manufacture of an actual semiconductor device in step S3.

Here, in this embodiment, priorities may be assigned to steps S4 and S5, and they may be carried out.

Figure 10:
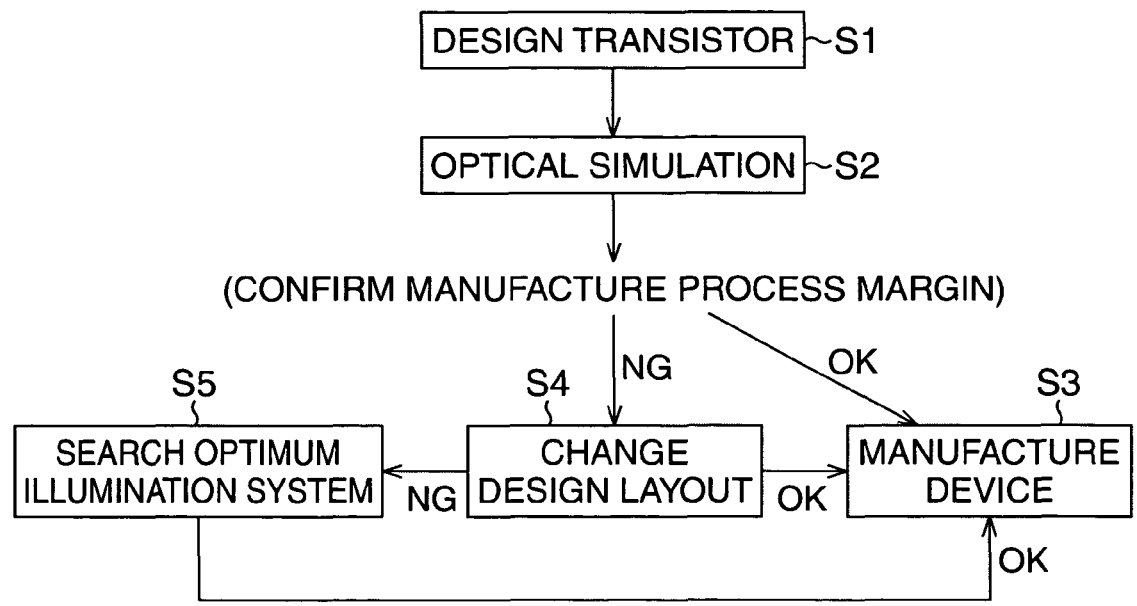
FIG. 10 is a flow chart showing another example of the designing method of a semiconductor device according to this embodiment.

The design flow when step S4 is performed prior to step S5 is shown in FIG. 10. In this case, steps S1 to S3 are the same as in FIG. 9.

When the required manufacture process margins are not secured for all or some of the patterns, step S4 is carried out first.

Subsequently, it is determined whether or not change of design layout to meet the predetermined allowable range is possible (step 11). When it is determined as possible, the design data is provided for manufacture of an actual semiconductor device in step S3. When it is determined as impossible, the flow goes to step S5, and optimization of the illumination state is searched for. Then, after the design data is changed, the design data is provided for manufacture of an actual semiconductor device in step S3.

Figure 11:
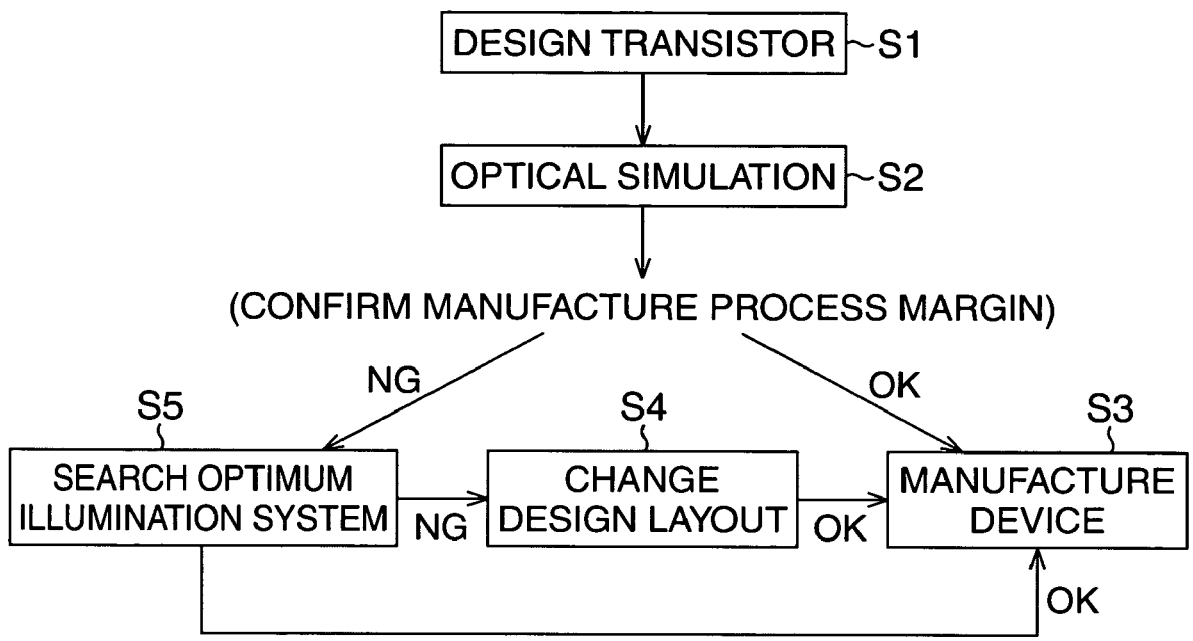
FIG. 11 is a flow chart showing another example of the designing method of a semiconductor device according to this embodiment.

Meanwhile, the design flow of the case where step S5 is performed prior to step S4 is shown in FIG. 11. In this case, steps S1 to S3 are the same as in FIG. 9.

When the required manufacture process margins are not secured for all or some of the patterns, step S5 is carried out first.

Subsequently, it is determined whether or not optimization of the illumination state is possible within the range of the illumination state realizable by the illumination control mechanism of the aligner (step 12). When it is determined as possible, the design data is provided for manufacture of an actual semiconductor device in step S3. When it is determined as impossible, the flow goes to step S4, and the design layout is changed. Then, after the design data is changed, the design data is provided for manufacture of an actual semiconductor device in step S3.

In FIGS. 9, 10 and 11, the case where the reference value of the manufacture process margin cannot be satisfied by any of steps S4 and S5 is conceivable. In this case, it is preferable to return to step S1, for example, and adopt the configuration of performing design of the MOS transistor again.

—First Pattern Forming Method—

In this method, the case where gate layer patterns, two kinds of L&S patterns differing in pitch in this case, are transferred onto the photoresist above a semiconductor substrate by a photolithography technique will be shown as an example. Here, the gate layer means a conductive member extending in a band shape from a portion above an element isolation region to a portion above an active region, and for convenience of explanation, the portion above the active region will be called a gate electrode, while the portion above the element isolation region will be called a gate wiring.

Figure 12A:
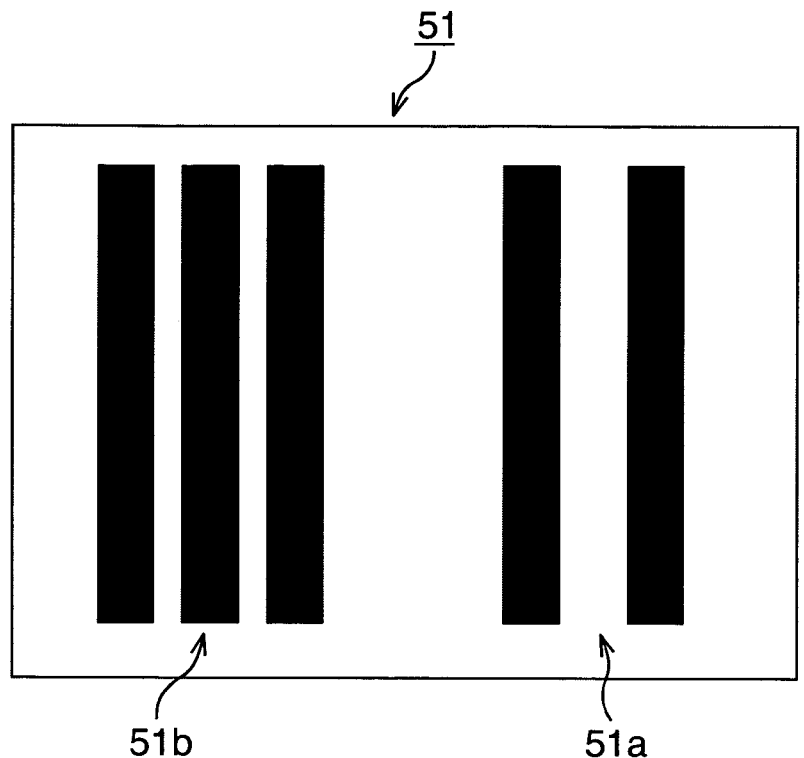
FIGS. 12A and 12B are schematic plane views showing a pair of photomasks used in a first pattern forming method.
Figure 12B:
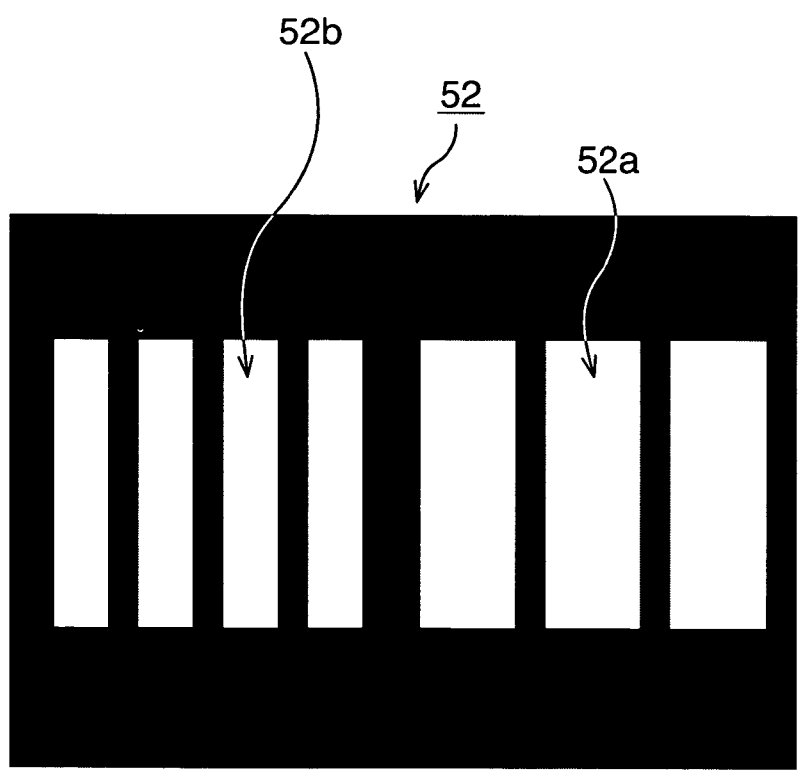

FIGS. 12A and 12B are schematic plane views showing a pair of photomasks used for a first pattern forming method, and FIGS. 13A to 13C and FIG. 14 are schematic plane views for explaining the first pattern forming method.

In this method, as shown in FIGS. 12A and 12B, a gate layer is formed by performing double exposure by using a first photomask 51 and a second photomask 52.

The first photomask 51 is an ordinary chrome mask, an attenuated phase shift mask or the like, and is constituted with first mask patterns 51a and 51b formed therein, as shown in FIG. 12A.

The first mask pattern 51a is the L&S pattern having width corresponding to a gate wiring to be formed.

The first mask pattern 51b is the L&S pattern also having width corresponding to the gate wiring, but is narrower in pitch than the first mask pattern 51a.

The second photomask 52 is not an alternating phase shift mask, but an ordinary chrome mask, an attenuated phase shift mask or the like as the first photomask 51, and is constituted with second mask patterns 52a and 52b formed therein as shown in FIG. 12B.

The second mask pattern 52a has the width (narrower than that of the gate wiring) and the pitch corresponding to a gate electrode to be formed so as to overlap the first mask pattern 51a, and is an L&S pattern narrower in width than the first mask pattern 51a.

The second mask pattern 52b has the width (narrower than that of the gate wiring) and the pitch corresponding to a gate electrode to be formed so as to overlap the first mask pattern 51b, and is an L&S pattern narrower in width than the first mask pattern 51b.

Figure 13A:
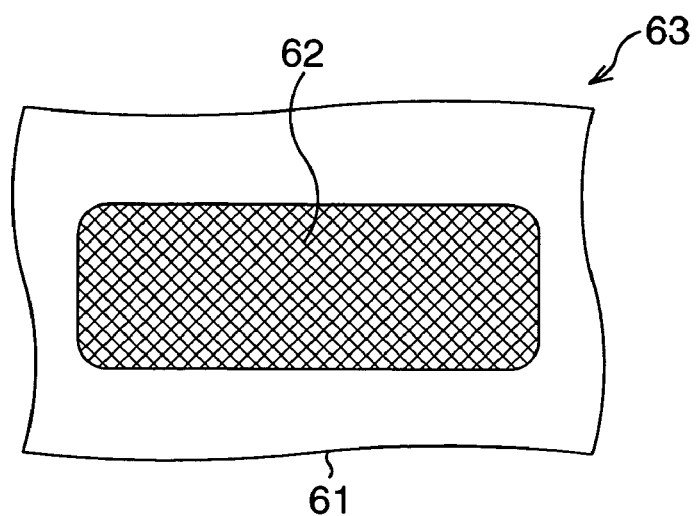
FIGS. 13A to 13C are schematic plane views showing a state in which mask patterns of the photomasks in FIGS. 12A and 12B are transferred.

As shown in FIG. 13A, on a silicon substrate that is a transfer object, an element isolation region 61, and an active region 62 defined by the element isolation region 61 are formed. In this state, a gate insulation film is formed on the active region 62, and etching hard masks such as a polycrystalline silicon film and a silicon oxide film (both not shown) are formed in sequence on the entire surface including the surface on the active region 62 to form an antireflection film (not shown). Thereafter, a photoresist 63 is coated and formed on the entire surface.

Figure 13B:
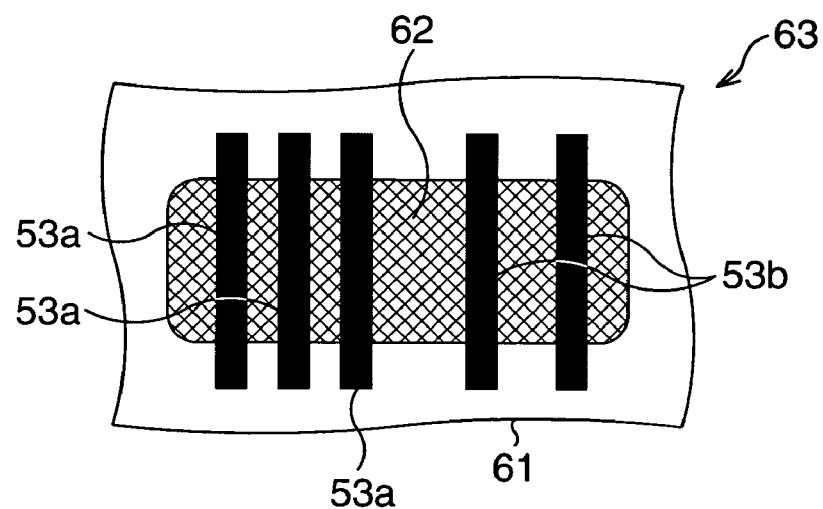

First, as shown in FIG. 13B, by using the first photomask 51, the first mask patterns 51a and 51b are exposed to the photoresist 63 above the silicon substrate. By the exposure, latent images of gate wiring patterns 53a and 53b extending across the active region 62 are transferred to the photoresist 63 following (the reduced projection images) of the first mask patterns 51a and 51b.

Subsequently, by using the second photomask 52, the second mask patterns 52a and 52b are exposed to the photoresist 63 so as to overlap the first mask patterns 51a and 51b above the active region 62. In this method, an illumination system of which light intensity distribution of the exposed light irradiated to the second photomask 52 is adjusted so as to be in an illumination state in which two kinds of double pole illuminations are combined at different positions from each other is used on the occasion of this exposure.

More specifically, the illumination state in FIG. 1B corresponding to the second mask patterns 52a and 52b is adopted, and exposure is performed. Here, the double pole illumination 1 in FIG. 1B (a pair of illumination modes 11a and 11b) is what is optimized corresponding to the second mask pattern 52a, and the double pole illumination 2 (a pair of illumination modes 12a and 12b) is what is optimized corresponding to the second mask pattern 52b.

Even if the mask pattern to be exposed is so fine that it is accurately formed by using, for example, an alternating phase shift mask, the mask pattern can be transferred accurately with extremely wide manufacture process margins equivalent to the case of using an alternating phase shift mask, by performing exposure with a plurality (two kinds in the above described example) of double pole illuminations optimized for the pattern of the most frequent appearance, in an ordinary chrome mask, an attenuated phase shift mask or the like.

By performing exposure by adjusting the light intensity distribution to be in the illumination state made by combining the double pole illuminations 1 and 2 optimized respectively for the second mask patterns 52a and 52 as above, very steep light intensities can be obtained for the respective second mask patterns 52a and 52b extending in the vertical direction and differing in pitch without using a special photomask like an alternating phase shift mask. Accordingly, it becomes possible to transfer two kinds of second mask patterns 52a and 52b differing in pitch to the photoresist 63 accurately in the respectively optimized states with extremely wide manufacture process margins equivalent to the case of using an alternating phase shift mask.

Figure 13C:
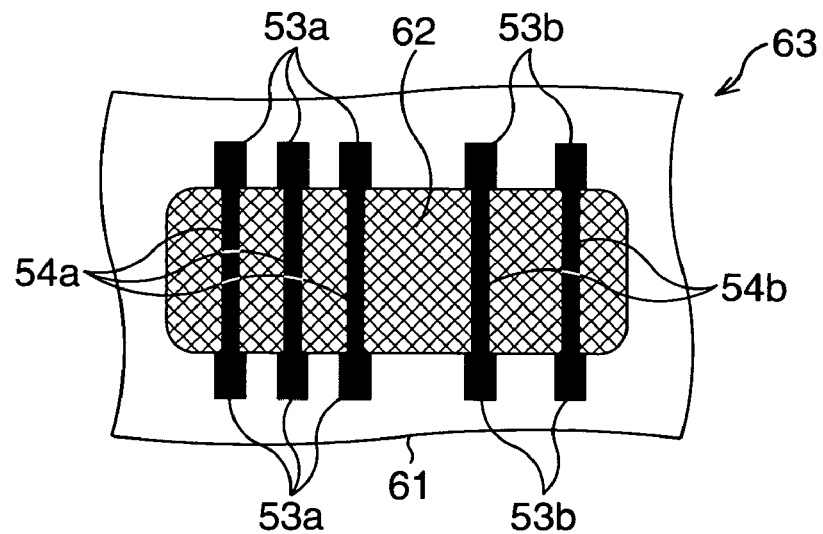

As shown in FIG. 13C, by the above described double pole exposure, in the photoresist 63, the second mask patterns 52a and 52b are not superimposed on the first mask patterns 51a and 51b above the element isolation region 61, and therefore, the latent images of gate wiring patterns 53a and 53b remain. On the other hand, above the active region 62, the second mask pattern 52a is superimposed on the first mask pattern 51a, and the second mask pattern 52b is superimposed on the first mask pattern 51b. Therefore, the latent images of the gate electrode patterns 54a and 54b extending on the active region 62 are transferred to the photoresist 63 following (the reduced projection images) of the second mask patterns 52a and 52b.

The above described exposure may be performed by using a polarized illumination system having the function of the above described double pole illumination. The polarized illumination system is an illumination system constructed so that light irradiated to a photomask (reticle) is in a linear polarized state unlike an illumination system using light in an ordinary non-polarized state, and by performing exposure by combining the function of the double pole illumination with the polarized illumination system, the effect of more enhancing contrast of light intensity than in the non-polarized state is provided.

Figure 14:
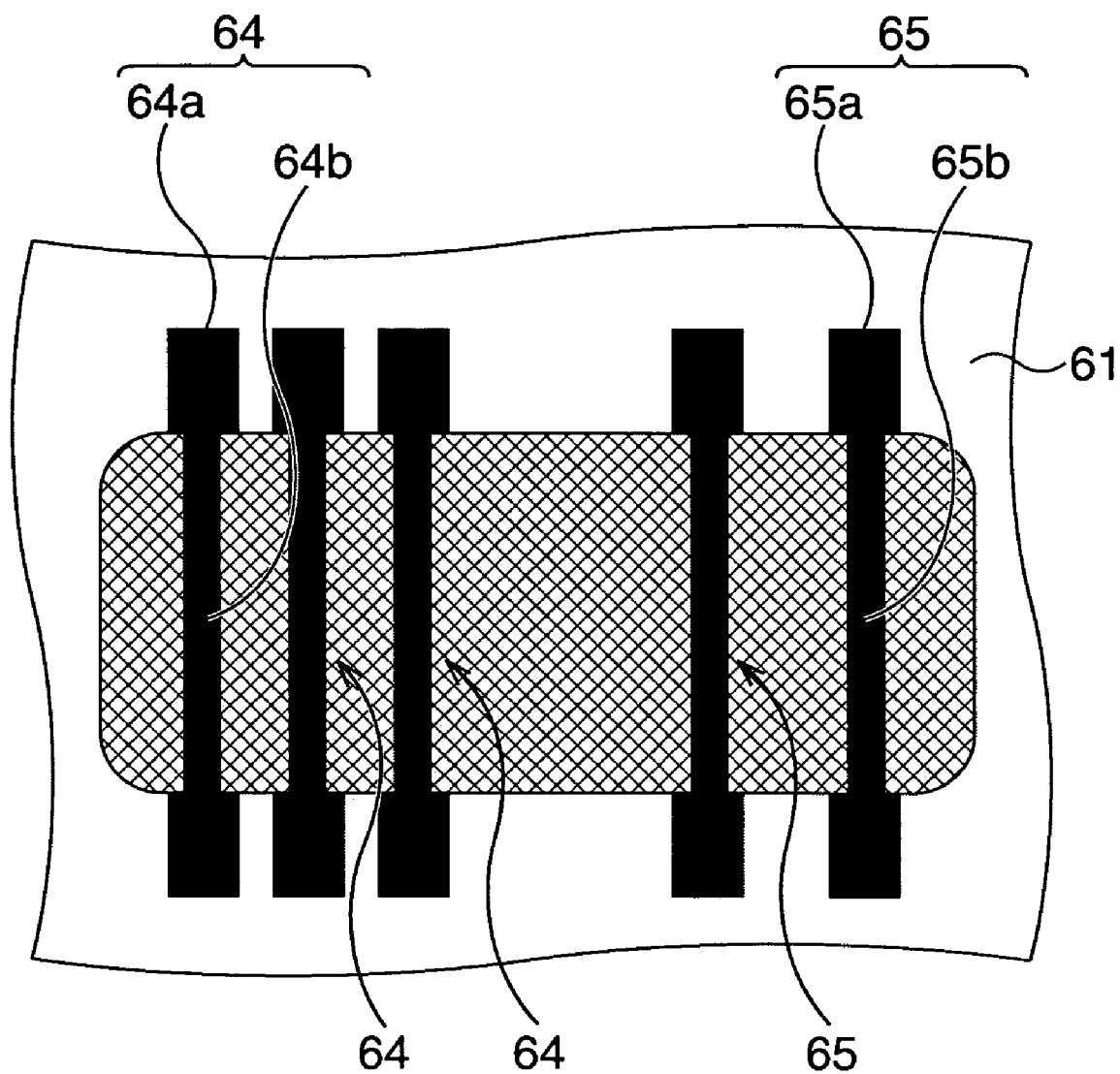
FIG. 14 is a schematic plane view showing a photoresist formed by the first pattern forming method.

Subsequently, by performing development or the like of the photoresist 63, resist patterns 64 and 65 are formed as shown in FIG. 14.

The resist pattern 64 is made by integrally forming patterns 64a and 64b so that the patterns 64a corresponding to the wide gate wiring patterns 53a are located above the element isolation region 61, and the patterns 64b which are narrower than the patterns 64a and corresponding to the gate electrode patterns 54a are located above the active region 62.

The resist pattern 65 is made by integrally forming patterns 65a and 65b so that the patterns 65a corresponding to the wide gate wiring patterns 53b are located above the element isolation region 61, and the patterns 65b which are narrower than the patterns 65a and correspond to the gate electrode patterns 54b are located above the active region 62.

In this case, the gate electrode patterns 54a and 54b are transferred to the photoresist 63 extremely accurately with large manufacture process margins respectively secured by exposure using the above described two kinds of double pole illuminations 1 and 2, and therefore, the patterns 64b and 65b are accurately formed to have predetermined fine widths.

A so-called assist feature may be formed for at least one of the first photomask 51 and the second photomask 52.

More specifically, a plurality of assist features arranged side by side as stripe-shaped pitch patterns are provided in parallel with the first mask patterns 51a and 51b (and/or the second mask patterns 52a and 52b) of the first photomask 51 (and/or the second photomask 52). The assist features are formed to further enhance the process margins on exposing the first mask patterns 51*a* and 51*b* (and/or the second mask patterns 52*a* and 52*b*).

The case where an assist feature is provided at only the first photomask 51 will be described as an example hereinafter for convenience.

Normally, an assist feature requires to be in the state in which the assist feature itself is not transferred (for example, formed to have the width of the exposure limit or less) since it is to assist exposure of the mask pattern. Thus, an assist feature provides an extremely large process margin but on the other hand, a large restriction is imposed on its size. On the other hand, in the above described case, the exposed portion of the assist feature corresponds to the light transmission portion of the photomask 52, and therefore, the assist feature does not especially have to be formed into the state which is not transferred. Accordingly, if single exposure using only the first photomask 51 is performed, an assist feature can be formed into such a size that it is transferred with the first mask patterns 51*a* and 51*b*. Namely, in this case, an extremely large process margin can be obtained without a restriction imposed on the size of the assist feature.

—Second Pattern Forming Method—

In this method, the case where gate layer patterns, in this case, four kinds of L&S patterns classified into two kinds of states differing in pitch and two kinds of states with extending directions of patterns perpendicular to each other, are transferred onto the photoresist above a semiconductor substrate by a photolithography technique will be described as an example.

Figure 15A:
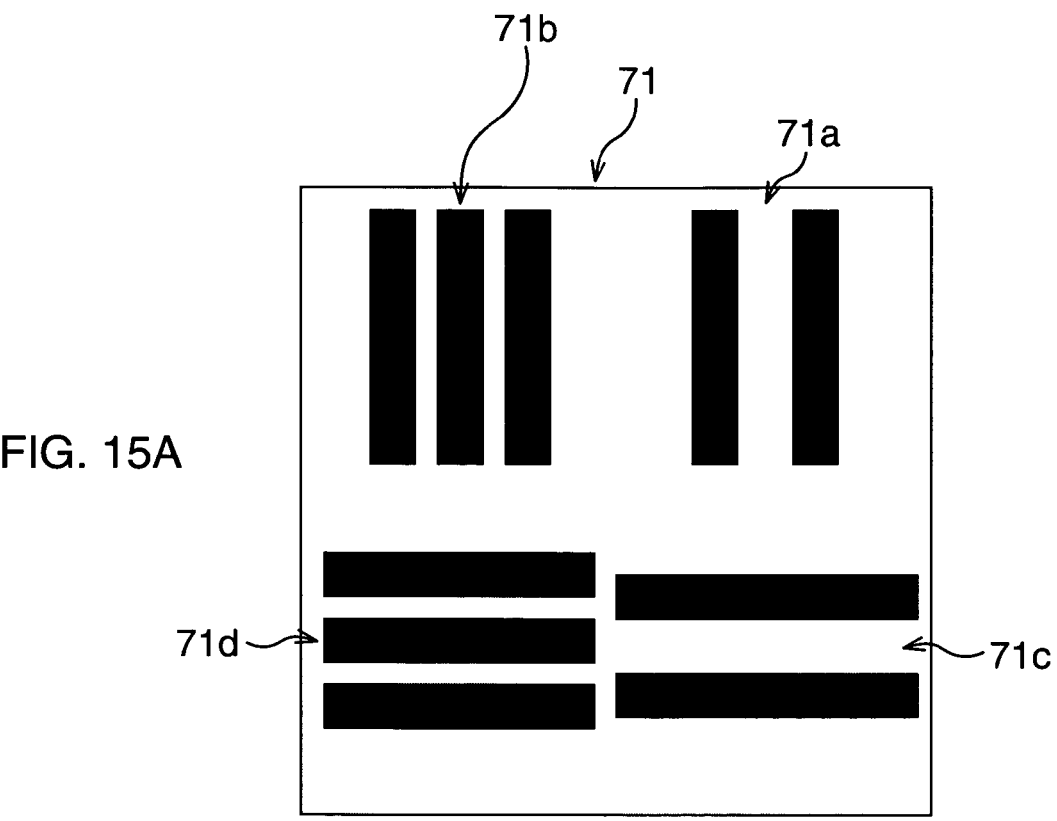
FIGS. 15A and 15B are schematic plane views showing a pair of photomasks used in a second pattern forming method.
Figure 15B:
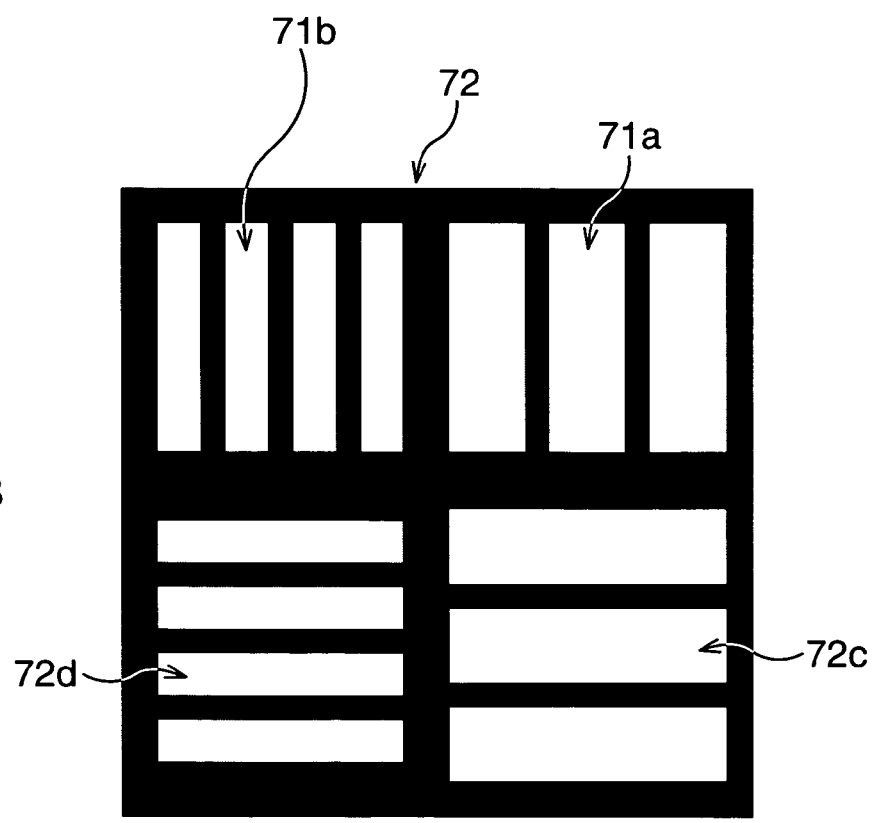

FIGS. 15A and 15B are schematic plane views showing a pair of photomasks used in a second pattern forming method, and FIGS. 16 to 19 are schematic plane views for explaining the second pattern forming method.

In this method, as shown in FIGS. 15A and 15B, a gate layer is formed by performing double exposure by using a first photomask 71 and a second photomask 72.

The first photomask 71 is an ordinary chrome mask, an attenuated phase shift mask or the like, and is constituted with first mask patterns 71*a*, 71*b*, 71*c* and 71*d* formed therein, as shown in FIG. 15A.

The first mask pattern 71*a* is the L&S pattern having a width corresponding to a gate wiring to be formed.

The first mask pattern 71*b* is similarly the L&S pattern having a width corresponding to a gate wiring, but is narrower in pitch than the first mask pattern 71*a*.

The first mask pattern 71*c* is made to have the same pitch as the first mask pattern 71*a*, but its extending direction is made the direction perpendicular to that of the first mask pattern 71*a*.

The first mask pattern 71*d* is made to have the same pitch as the first mask pattern 71*b*, but its extending direction is made the direction perpendicular to that of the first mask pattern 71*b*.

The second photomask 72 is not an alternating phase shift mask, but an ordinary chrome mask, an attenuated phase shift mask or the like as the first photomask 71, and is constituted with second mask patterns 72*a*, 72*b*, 72*c* and 72*d* formed therein as shown in FIG. 15B.

The second mask pattern 72*a* has the width (narrower than that of the gate wiring) and the pitch corresponding to a gate electrode to be formed so as to overlap the first mask pattern 71*a*, and is an L&S pattern narrower in width than the first mask pattern 71*a*.

The second mask pattern 72*b* has the width (narrower than that of the gate wiring) and the pitch corresponding to a gate electrode to be formed so as to overlap the first mask pattern 71*b*, and is an L&S pattern narrower in width than the first mask pattern 71*b*.

The second mask pattern 72*c* has the width (narrower than that of the gate wiring) and the pitch corresponding to a gate electrode to be formed so as to overlap the first mask pattern 71*c*, and is an L&S pattern narrower in width than the first mask pattern 71*c*.

The second mask pattern 72*d* has the width (narrower than that of the gate wiring) and the pitch corresponding to a gate electrode to be formed so as to overlap the first mask pattern 71*d*, and is an L&S pattern narrower in width than the first mask pattern 71*d*.

Figure 16:
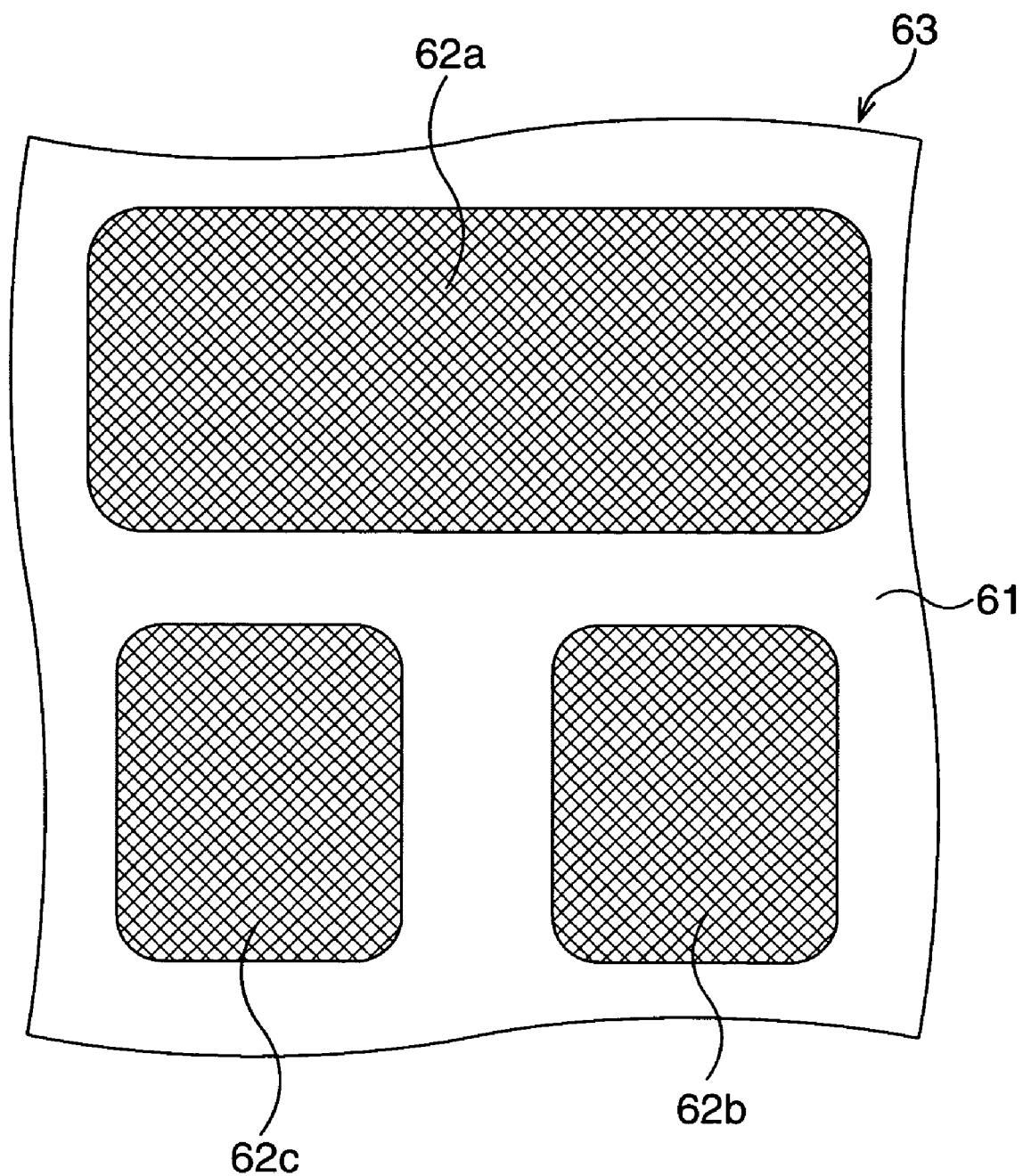
FIG. 16 is a schematic plane view for explaining a pattern forming method according to the second pattern forming method.

As shown in FIG. 16, on a silicon substrate that is a transfer object, an element isolation region 61, and active regions 62*a*, 62*b* and 62*c* defined by the element isolation region 61 are formed. In this state, a gate insulation film is formed on the active regions 62*a*, 62*b* and 62*c*, and etching hard masks such as a polycrystalline silicon film and a silicon oxide film (both not shown) are formed in sequence on the entire surface including the surfaces on the active regions 62*a*, 62*b* and 62*c* to form an antireflection film (not shown). Thereafter, a photoresist 63 is coated and formed on the entire surface.

Figure 17:
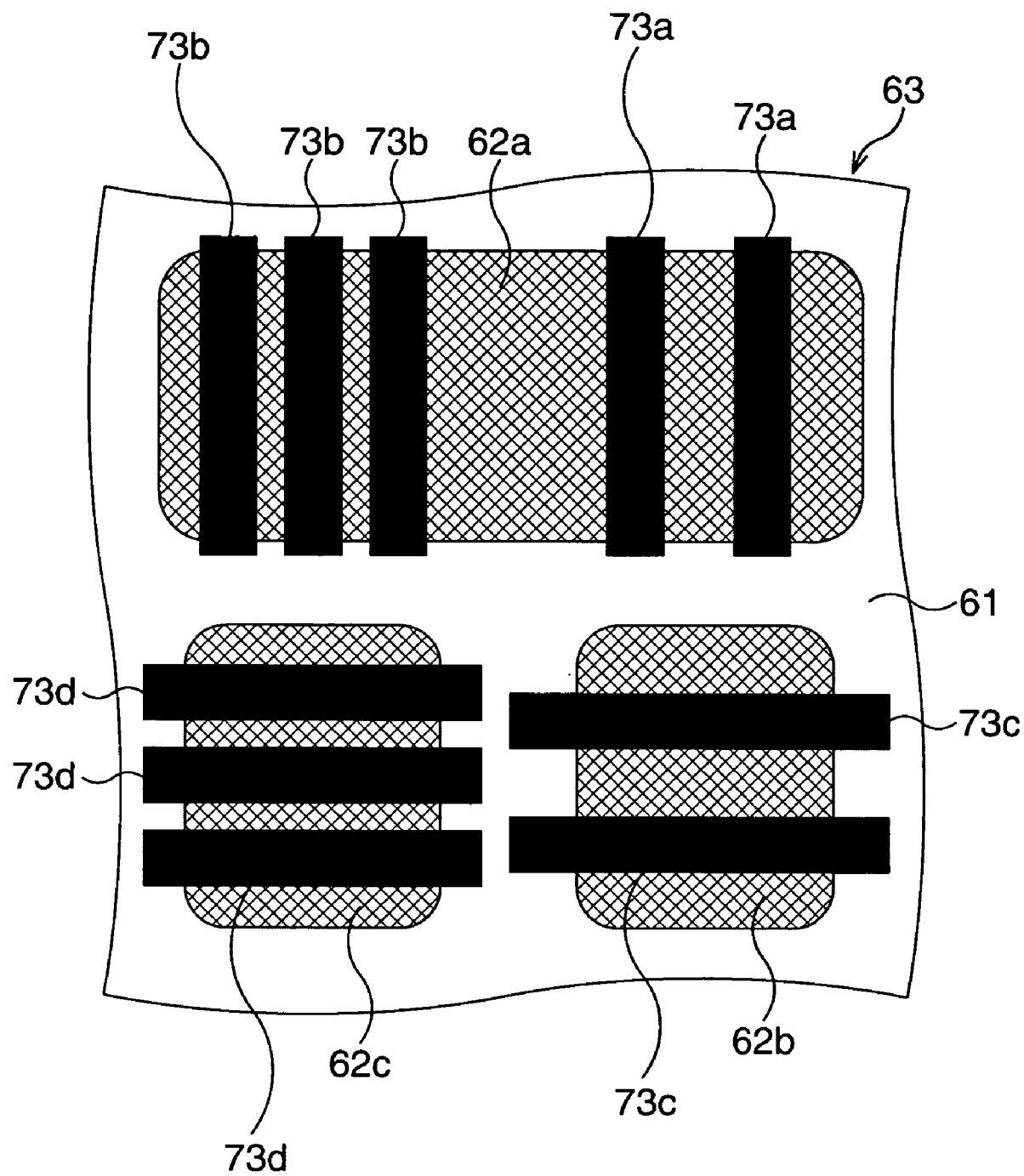
FIG. 17 is a schematic plane view for explaining the pattern forming method according to the second pattern forming method.

First, as shown in FIG. 17, by using the first photomask 71, the first mask patterns 71*a*, 71*b*, 71*c* and 71*d* are exposed to the photoresist 63 above the silicon substrate. By the exposure, latent images of gate wiring patterns 73*a* and 73*b* extending across the active region 62*a*, gate wiring patterns 73*c* extending across the active region 62*b*, and gate wiring patterns 73*d* extending across the active region 62*c* are transferred to the photoresist 63 following (the reduced projection images) of the first mask patterns 71*a*, 71*b*, 71*c* and 71*d*.

Subsequently, by using the second photomask 72, the second mask patterns 72*a*, 72*b*, 72*c* and 72*d* are exposed to the photoresist 63 so as to overlap the first mask patterns 71*a*, 71*b*, 71*c* and 71*d* above the active regions 62*a*, 62*b* and 62*c*. In this method, an illumination system of which light intensity distribution of the exposure light which is irradiated to the second photomask 72 is adjusted so as to be in an illumination state in which two kinds of double pole illuminations are combined at different positions from each other is used on the occasion of this exposure.

More specifically, the illumination state in FIG. 4B corresponding to the second mask patterns 72*a*, 72*b*, 72*c* and 72*d* is adopted, and exposure is performed. Here, the quadrupole illumination 31 in FIG. 4B (a pair of illumination modes 41*a* and 41*b*) is what is optimized corresponding to the second mask patterns 72*a* and 72*c*, and the quadrupole illumination 32 (a pair of illumination modes 42*a* and 42*b*) is what is optimized corresponding to the second mask patterns 72*b* and 72*d*.

Even if the mask pattern to be exposed is so fine that it is accurately formed by using, for example, an alternating phase shift mask, the mask pattern can be transferred accurately with an extremely wide manufacture process margin equivalent to the case of using an alternating phase shift mask, by performing exposure with a plurality (two kinds in the above described example) of quadrupole illuminations optimized for the most frequent pattern in an ordinary chrome mask, an attenuated phase shift mask or the like.

By performing exposure by adjusting the light intensity distribution to be in the illumination state made by combining the quadrupole illuminations 31 and 32 optimized respectively for the second mask patterns 72*a* and 72*c*, and 72*b* and 72*d* as above, very steep light intensities can be obtained for the respective second mask patterns 72*a*, 72*b*, 72*c* and 72*d* extending in the directions perpendicular to each other and differing in pitch, without using a special photomask like an alternating phase shift mask. Accordingly, it becomes possible to transfer four kinds of second mask patterns 72a, 72b, 72c and 72d differing in extending direction and pitch to the photoresist 63 accurately in the respectively optimized state with extremely wide manufacture process margins equivalent to the case of using an alternating phase shift mask.

Figure 18:
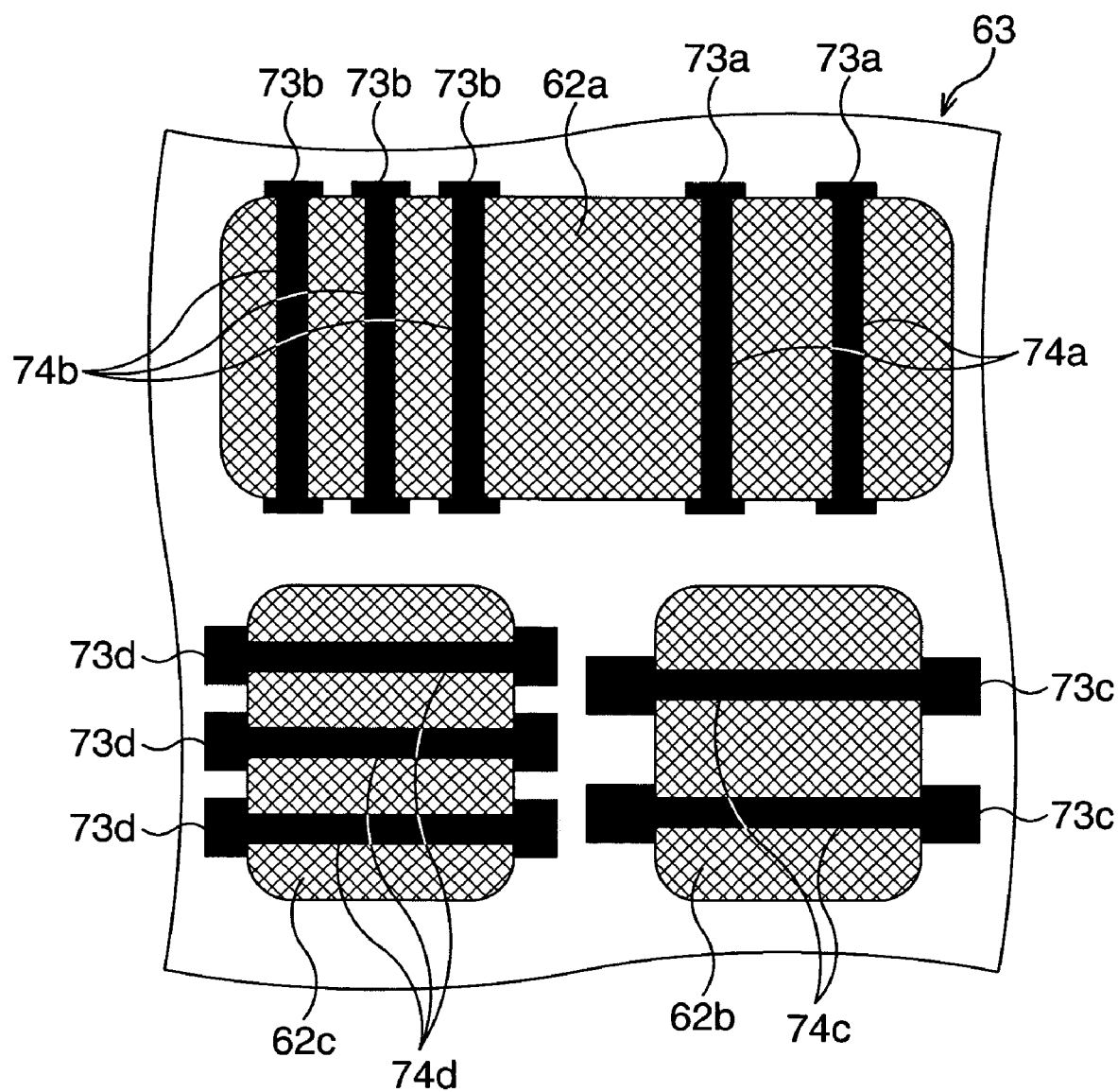
FIG. 18 is a schematic plane view for explaining the pattern forming method according to the second pattern forming method.

As shown in FIG. 18, by the above described quadrupole exposure, in the photoresist 63, the second mask patterns 72a and 72b are not superimposed on the first mask patterns 71a and 71b above the element isolation region 61 surrounding the active region 62a, and therefore, the latent images of the gate wiring patterns 73a and 73b remain. On the other hand, on the active region 62a, the second mask pattern 72a is superimposed on the first mask pattern 71a, and the second mask pattern 72b is superimposed on the first mask pattern 71b. Therefore, the latent images of the gate electrode patterns 74a and 74b extending above the active region 62a are transferred to the photoresist 63 following (the reduced projection images) of the second mask patterns 72a and 72b.

Similarly, by the above described quadrupole exposure, in the photoresist 63, the second mask pattern 72c is not superimposed on the first mask pattern 71c above the element isolation region 61 surrounding the active region 62b, and therefore, the latent images of the gate wiring patterns 73c remain. On the other hand, above the active region 62b, the second mask pattern 72c is superimposed on the first mask pattern 71c. Therefore, the latent images of the gate electrode patterns 74c extending on the active region 62b are transferred to the photoresist 63 following (the reduced projection image) of the second mask patterns 72c.

Similarly, by the above described quadrupole exposure, in the photoresist 63, the second mask pattern 72d is not superimposed on the first mask pattern 71c above the element isolation region 61 surrounding the active region 62c, and therefore, the latent images of the gate wiring patterns 73d remain. On the other hand, above the active region 62c, the second mask pattern 72d is superimposed on the first mask pattern 71d. Therefore, the latent images of the gate electrode patterns 74d extending on the active region 62c are transferred to the photoresist 63 following (the reduced projection image) of the second mask patterns 72d.

The above described exposure may be performed by using a polarized illumination system having the function of the above described quadrupole illumination. The polarized illumination system is an illumination system constructed so that light irradiated to a photomask (reticle) is in a linear polarized state, unlike an ordinary illumination system using light in a non-polarized state, and by performing exposure by combining the function of the quadrupole illumination with the polarized illumination system, the effect of more enhancing contrast of light intensity than in the non-polarized state is provided.

Figure 19:
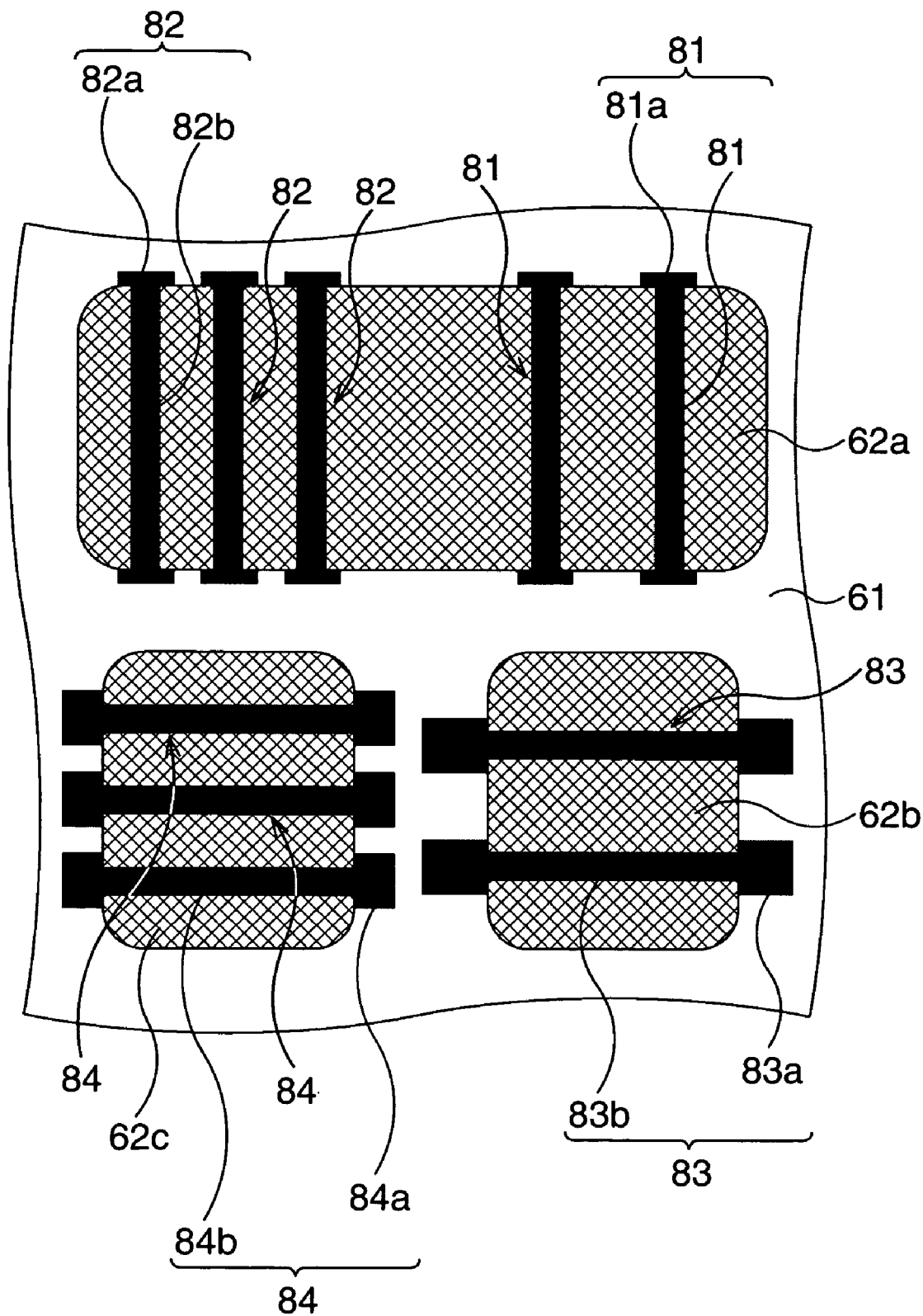
FIG. 19 is a schematic plane view showing a photoresist formed by the second pattern forming method.

Subsequently, by performing development or the like of the photoresist 63, resist patterns 81, 82, 83 and 84 are formed as shown in FIG. 19.

The resist pattern 81 is made by integrally forming patterns 81a and 81b so that the patterns 81a corresponding to the wide gate wiring patterns 73a are located above the element isolation region 61, and the patterns 81b which are narrower than the patterns 81a and corresponding to the gate electrode patterns 74a are located above the active region 62a.

The resist pattern 82 is made by integrally forming patterns 82a and 82b so that the patterns 82a corresponding to the wide gate wiring patterns 73b are located above the element isolation region 61, and the patterns 82b which are narrower than the patterns 82a and correspond to the gate electrode patterns 74b are located above the active region 62a.

The resist pattern 83 is made by integrally forming patterns 83a and 83b so that the patterns 83a corresponding to the wide gate wiring patterns 73c are located above the element isolation region 61, and the patterns 83b which are narrower than the patterns 83a and correspond to the gate electrode patterns 74c are located above the active region 62b.

The resist pattern 84 is made by integrally forming patterns 84a and 84b so that the patterns 84a corresponding to the wide gate wiring patterns 73d are located above the element isolation region 61, and the patterns 84b which are narrower than the patterns 84a and correspond to the gate electrode patterns 74d are located above the active region 62c.

In this case, the gate electrode patterns 74a, 74b, 74c and 74d are transferred to the photoresist 63 extremely accurately with large manufacture process margins respectively secured by exposure using the above described two kinds of quadrupole illuminations 31 and 32, and therefore, the patterns 81b, 82b, 83b and 84b are accurately formed to have predetermined fine widths.

A so-called assist feature may be used for at least one of the first photomask 71 and the second photomask 72.

More specifically, a plurality of assist features arranged side by side as stripe-shaped pitch patterns are provided in parallel with the first mask patterns 71a, 71b, 71c and 71d (and/or the second mask patterns 71a, 72b, 72c and 72d) of the first photomask 71 (and/or the second photomask 72). The assist features are formed to further enhance the process margins on exposing the first mask patterns 71a, 71b, 71c and 71d (and/or the second mask patterns 72a, 72b, 72c and 72d).

The case where an assist feature is provided at only the first photomask 71 will be described as an example hereinafter for convenience.

Normally, an assist feature requires to be in the state in which the assist feature itself is not transferred (for example, formed to have the width of the exposure limit or less) since it is to assist exposure of the mask pattern. Such an assist feature can provide an extremely large process margin but on the other hand, a large restriction is imposed on its size. On the other hand, in the above described case, the exposed portion of the assist feature corresponds to the light transmission portion of the second photomask 72, and therefore, the assist feature does not especially have to be formed into the state in which it is not transferred. Accordingly, an assist feature can be formed into such a size that it is transferred with the first mask patterns 71a, 71b, 71c and 71d if single exposure using only the first photomask 71 is performed. Namely, in this case, an extremely large process margin can be obtained without a restriction imposed on the size of the assist feature.

—Manufacturing Method of MOS Transistor—

In this embodiment, a gate layer is formed by using the above described pattern forming method, and for example, an MOS transistor including the gate layer is produced. Here, the case of forming a gate layer by using the above described first pattern forming method will be described as an example. As a matter of course, the above described second pattern forming method may be preferably applied.

Figure 20A:
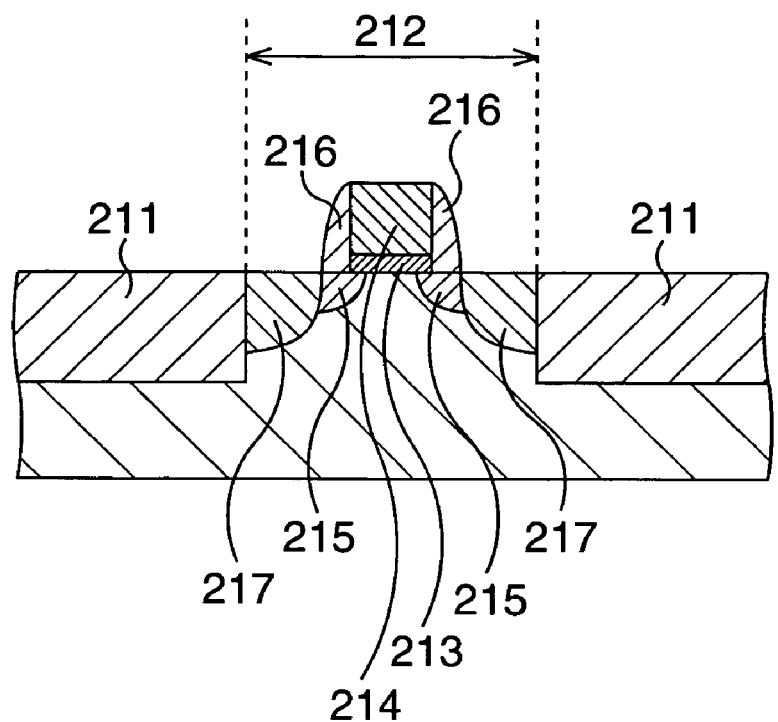
FIGS. 20A and 20B are schematic views showing a manufactured MOS transistor.
Figure 20B:
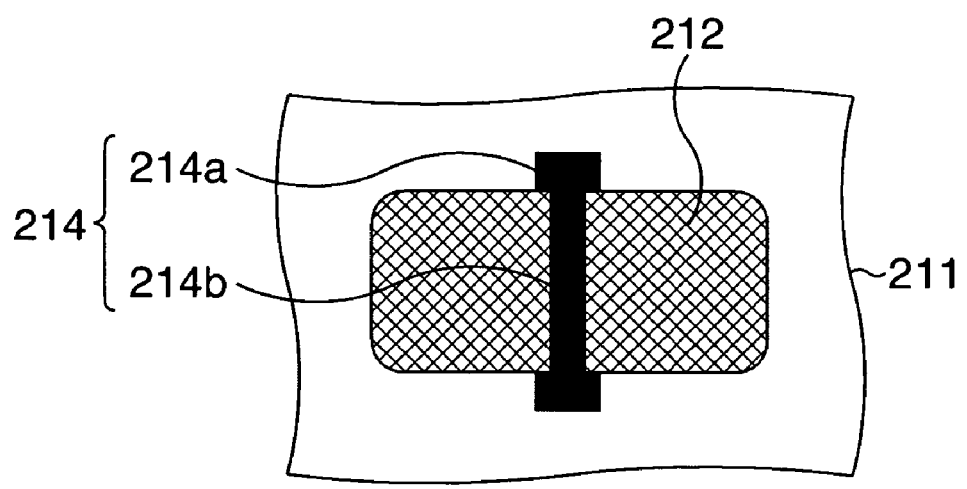
Figure 21A:
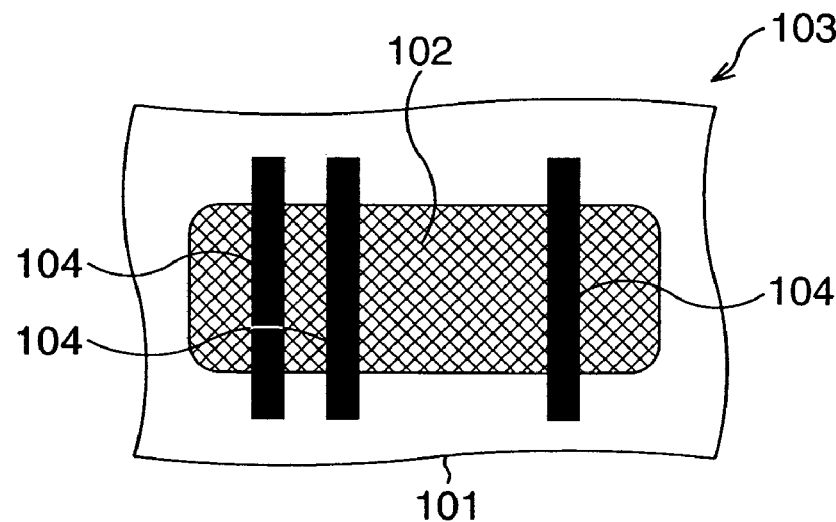
FIGS. 21A to 21C are schematic plane views showing one example of the conventional double pole exposure process.
Figure 21B:
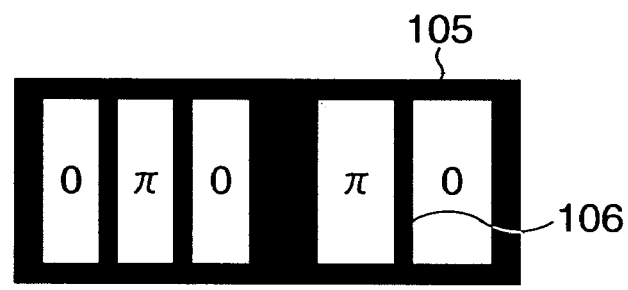
Figure 21C:
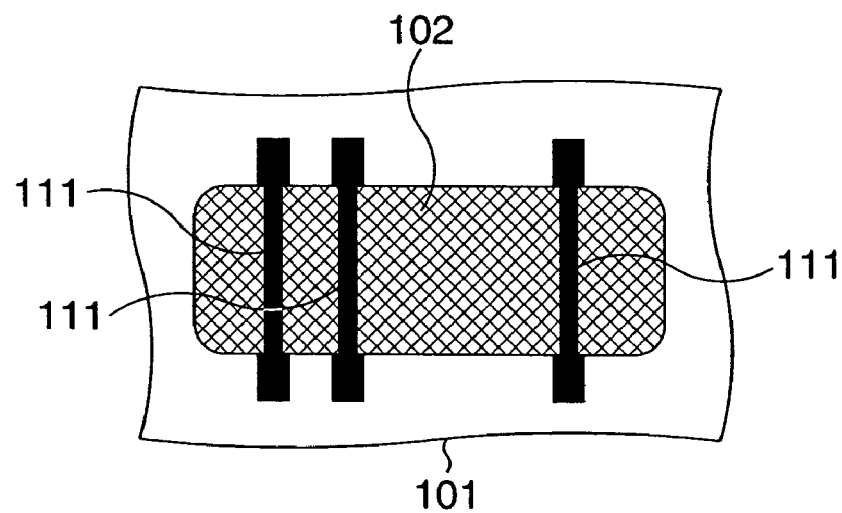

FIG. 20A is a schematic sectional view showing the produced MOS transistor, and FIG. 20B is a schematic plane view showing the state in which the gate layer is formed. Since the above described first pattern forming method is used here, two kinds of L&S patterns differing in pitch are transferred, but only one kind of gate layer will be shown in the following for convenience of illustration or the like.

First, on a silicon substrate, as an element isolation region 211, an element isolation structure is formed by, for example, an STI (Shallow Trench Isolation) method, and an active region 212 is defined.

Subsequently, a thin gate insulating film 213 is formed by, for example, thermally oxidizing the surface of the active region 212. A conductive film, for example, a polycrystalline silicon film (not shown) is deposited on an entire surface including the surface on the gate insulating film 213 by a CVD method or the like.

Subsequently, by using the above described first pattern forming method, resist patterns 64 and 65 are formed. Then, the polycrystalline silicon film is processed by dry etching using the resist patterns 64 and 65 as masks, and two kinds of gate layers in the shapes following the resist patterns 64 and 65 are formed. Here, only a gate layer 214 corresponding to, for example, the resist pattern 64 is shown. The gate layer 214 is constituted by integrally forming a gate wiring 214a and a gate electrode 214b so that the wide gate wiring 214a is located above the element isolation region 211, and the gate electrode 214b narrower than the gate wiring 214a is located above the active region 212 via the gate insulating film 213, as shown in FIG. 20B.

Subsequently, after the resist patterns 64 and 65 are removed by ashing or the like, an impurity (boron (B+) or the like in the case of a PMOS transistor, and phosphor (P+), arsenide (As+) or the like in the case of an NMOS transistor) is ion-implanted into a surface layer of the active region 212 in a relatively low concentration with the gate electrode 214b as a mask, and an LDD region 215 is formed.

Subsequently, an insulating film, for example, a silicon oxide film (not shown) is deposited on the entire surface to cover the gate layer 214 by a CVD method or the like, and the entire surface of the silicon oxide film is anisotropically etched (etch back). By the etch back, the silicon oxide film is left on only both side surfaces of the gate electrode 214b, and side wall spacers 216 are formed.

Subsequently, with the gate electrode 214 and the side wall spacers 216 as masks, an impurity (boron (B+) or the like in the case of a PMOS transistor, and phosphor (P+), arsenide (As+) or the like in the case of an NMOS transistor) is ion-implanted into a surface layer of the active region 212 in a higher concentration than in the LDD region 215, and a source/drain region 217 partially superimposed on the LDD region 215 is formed.

Thereafter, by going through the forming steps of an interlayer insulation film, a wiring layer electrically connected to the source/drain region 217, and the like, the MOS transistor is completed.

As described above, according to this embodiment, it is possible to cope with exposure for performing patterning in which micropatterns differing in pitch exist in close vicinity to one another, and to form micropatterns with high accuracy with sufficient manufacture process margins without using a photomask complicated in manufacture process at high manufacture cost like an alternating phase shift mask.

By applying this pattern forming method to formation of the gate layer 214, a microscopic MOS transistor including the gate layer 214 with a desired fine width can be accurately produced.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A designing method on performing pattern formation, comprising:
   carrying out a step of estimating a manufacturing process margin by a simulation with a condition of illuminating an exposure light in the first illumination state to a photomask; and
   carrying out a second step after carrying out a first step, or carrying out the first step after carrying out the second step, when the manufacturing process margin, estimated based on design data of the pattern formation, does not satisfy a reference value, wherein
   the first step is a step of changing a design layout of the pattern to satisfy an allowable range in a first illumination state when estimating the manufacturing process margin,
   the second step is a step of changing an illumination state by performing a simulation of adjusting a light intensity distribution of irradiation light which is irradiated to a photomask to be in a second illumination state in which a plurality of double pole illuminations or a plurality of quadrupole illuminations are combined at positions differing from each other so that the manufacturing process margin satisfies the reference value of the pattern in a design layout of the pattern when estimating the manufacturing process margin, in which when carrying out the above steps,
   a plurality of double pole illuminations in the second illumination state are formed by locating a plurality of illumination pairs symmetrically with respect to a central portion, and the distance between the illuminations is different with each of the illumination pairs, and
   a plurality of quadrupole illuminations in the second illumination state are formed by locating a plurality of quadrupole of illuminations symmetrically with respect to a central portion, and the distance between the two opposing illuminations is different with each quadrupole illumination.

2. The designing method according to claim 1, wherein the illumination state is formed by adjusting sizes of a pair of illumination modes constituting the illumination state for each of the illumination state.

3. The designing method according to claim 1, wherein the illumination state is formed by adjusting positions of a pair of illumination modes constituting the illumination state to be shifted inward or outward from a reference position of the illumination state for each of the double pole illuminations.

4. The designing method according to claim 1, wherein the illumination state is formed by adjusting shapes of a pair of illumination modes constituting the illumination state for each of the illumination state.

5. An exposure method, comprising exposing and transferring a mask pattern of a photomask to a transfer object in accordance with a design layout and an illumination state obtained by carrying out a first design step after carrying out a second design step, or carrying out the second design step after carrying out the first design step, when a manufacturing process margin, estimated based on design data of pattern formation, does not satisfy a reference value, wherein
   the first design step is a step of changing a design layout of the pattern to satisfy an allowable range in a first illumination state when estimating the manufacturing process margin,
   the second design step is a step of changing an illumination state by performing a simulation of adjusting a light intensity distribution of irradiation light which is irradiated to a photomask to be in a second illumination state in which a plurality of double pole illuminations or a plurality of quadrupole illuminations are combined at positions differing from each other so that the manufacturing process margin satisfies the reference value in a design layout of the pattern when estimating the manufacturing process margin, in which when carrying out the above steps, a plurality of double pole illuminations in the second illumination state are formed by locating a plurality of illumination pairs symmetrically with respect to a central portion, and the distance between the illuminations is different with each of the illumination pairs, and a plurality of quadrupole illuminations in the second illumination state are formed by locating a plurality of quadrupole of illuminations symmetrically with respect to a central portion, and the distance between the two opposing illuminations is different with each quadrupole illumination.

6. The exposure method according to claim 5, further comprising:

on exposing and transferring the mask pattern of the photomask to the transfer object, a first exposure step of exposing a first mask pattern to the transfer object by using a first photomask; and a second exposure step of exposing a second mask pattern to the transfer object by using a second photomask so that at least part of the second mask pattern is superimposed on the first mask pattern;

wherein when transferring a pattern to the transfer object by composite exposure of the first mask pattern and the second mask pattern, exposure is performed by using the illumination state in at least one of said first exposure step and said second exposure step.

7. The exposure method according to claim 6, wherein in said second exposure step, each of the second mask pattern which is finer than each of the first mask pattern is exposed to the transfer object by using a chrome mask or an attenuated phase shift mask as the second photomask.

* * * * *